(12) United States Patent  
Starkey

(10) Patent No.: US 11,890,506 B2  
(45) Date of Patent: Feb. 6, 2024

(54) PHYSICAL EDUCATION KINEMATIC MOTOR SKILLS TESTING SYSTEM

(71) Applicant: AssessLink LLC, Sturgis, MI (US)

(72) Inventor: Jonathan Bradford Starkey, Sturgis, MI (US)

(73) Assignee: AssessLink LLC, Sturgis, MI (US)

( * ) Notice: Subject to any disclaimer, the term of this patent is extended or adjusted under 35 U.S.C. 154(b) by 0 days.

(21) Appl. No.: 17/244,563

(22) Filed: Apr. 29, 2021

(65) Prior Publication Data

US 2021/0339084 A1 Nov. 4, 2021

Related U.S. Application Data

(63) Continuation of application No. 16/891,592, filed on Jun. 3, 2020, now Pat. No. 11,020,632, which is a (Continued)

(51) Int. Cl.
| | |
|---|---|
| *A63B 24/00* | (2006.01) |
| *G01P 13/00* | (2006.01) |
| *G01S 17/50* | (2006.01) |
| *G09B 19/00* | (2006.01) |
| *G09B 5/02* | (2006.01) |
| *A63B 69/00* | (2006.01) |

(Continued)

(52) U.S. Cl.
CPC ...... *A63B 24/0006* (2013.01); *A63B 24/0075* (2013.01); *A63B 69/00* (2013.01); *A63B 71/06* (2013.01); *G01P 13/00* (2013.01); *G01S 17/50* (2013.01); *G01S 17/89* (2013.01); *G09B 5/02* (2013.01); *G09B 19/003* (2013.01); *A63B 2024/0009* (2013.01); *A63B 2024/0015* (2013.01); *A63B 2220/803* (2013.01); *A63B 2220/836* (2013.01)

(58) Field of Classification Search
CPC . A63B 24/0006; A63B 24/0075; A63B 69/00; A63B 71/06; G01P 13/00; G01S 17/50; G01S 17/89; G09B 5/02; G09B 19/003
USPC ........................................................ 434/257
See application file for complete search history.

(56) References Cited

U.S. PATENT DOCUMENTS

| | | |
|---|---|---|
| 4,502,035 A | 2/1985 | Obenauf et al. |
| 4,828,500 A | 5/1989 | Seidel et al. |

(Continued)

OTHER PUBLICATIONS

Microsoft Corporation, "Kinect SDK by Windows," Retrieved Oct. 9, 2017. https://developer.microsoft.com/en-us/windows/kinect.

*Primary Examiner* — Robert P Bullington
(74) *Attorney, Agent, or Firm* — Amundsen Davis LLC

(57) ABSTRACT

Disclosed herein is a system for testing motor skills involved in locomotor, non-locomotor, and manipulative activities. The system utilizes joint data created by a motion sensor during a subject's performance of an activity to determine the subject's motor skill proficiency for that activity. The system compares the subject's joint data to benchmark data to detect one or more phases of the activity. Based on the comparison, the system also determines the subject's proficiency in the particular motor skill tested. The system is embodied in a computer-implemented application that provides various user interfaces for navigating through the user interfaces, accessing a database of the system, testing a subject's motor skills, analyzing a subject's proficiency, and facilitating practice of motor skills.

40 Claims, 13 Drawing Sheets

Related U.S. Application Data continuation of application No. 15/676,238, filed on Aug. 14, 2017, now Pat. No. 10,695,611.

(51) Int. Cl.
*A63B 71/06* (2006.01)
*G01S 17/89* (2020.01)

(56) References Cited

U.S. PATENT DOCUMENTS

| | | | |
|---|---|---|---|
| 5,857,855 A | 1/1999 | Katayama | |
| 5,980,429 A | 11/1999 | Nashner | |
| 6,056,671 A | 5/2000 | Marmer | |
| 6,685,480 B2 | 2/2004 | Nishimoto et al. | |
| 8,400,494 B2 | 3/2013 | Zalevsky et al. | |
| 9,350,951 B1 | 5/2016 | Rowe | |
| 10,695,611 B2 | 6/2020 | Starkey | |
| 2002/0115046 A1* | 8/2002 | McNitt | A63B 69/36 434/252 |
| 2002/0187846 A1 | 12/2002 | Funk | |
| 2003/0109322 A1 | 6/2003 | Funk et al. | |
| 2005/0013467 A1 | 1/2005 | McNitt | |
| 2005/0223799 A1 | 10/2005 | Murphy | |
| 2005/0272517 A1 | 12/2005 | Funk et al. | |
| 2006/0166737 A1 | 7/2006 | Bentley | |
| 2006/0247070 A1 | 11/2006 | Funk et al. | |
| 2006/0281060 A1 | 12/2006 | Katayama | |
| 2006/0281977 A1 | 12/2006 | Soppet | |
| 2007/0015611 A1 | 1/2007 | Noble et al. | |
| 2008/0191864 A1 | 8/2008 | Wolfson | |
| 2009/0018795 A1 | 1/2009 | Priester et al. | |
| 2011/0045925 A1 | 2/2011 | Moye | |
| 2011/0159976 A2 | 6/2011 | Hohla et al. | |
| 2011/0230273 A1 | 9/2011 | Niegowski et al. | |
| 2011/0230274 A1 | 9/2011 | Lafortune et al. | |
| 2011/0230985 A1 | 9/2011 | Niegowski et al. | |
| 2011/0230986 A1 | 9/2011 | Lafortune et al. | |
| 2013/0005496 A1 | 1/2013 | Priester et al. | |
| 2013/0123667 A1 | 5/2013 | Komatireddy et al. | |
| 2014/0257744 A1 | 9/2014 | Lokshin et al. | |
| 2014/0288874 A1 | 9/2014 | Matsunaga et al. | |
| 2016/0158621 A1 | 6/2016 | Stahl | |
| 2016/0199693 A1* | 7/2016 | Vermilyea | A61B 5/1122 700/91 |
| 2018/0001126 A1 | 1/2018 | Klopman | |
| 2018/0140917 A1 | 5/2018 | Song et al. | |
| 2018/0178060 A1 | 6/2018 | Yeh et al. | |
| 2018/0200575 A1 | 7/2018 | Nagaishi et al. | |

* cited by examiner

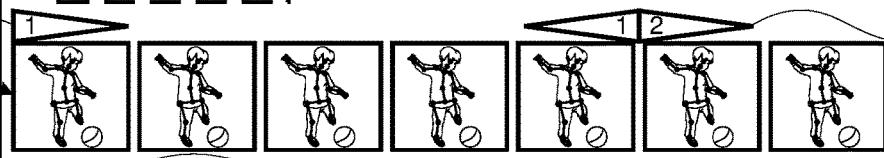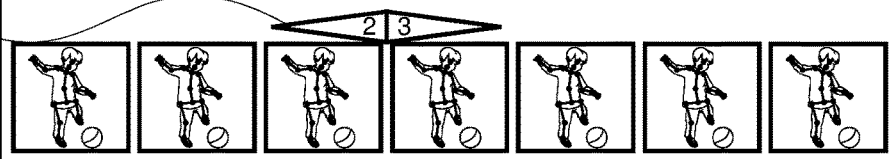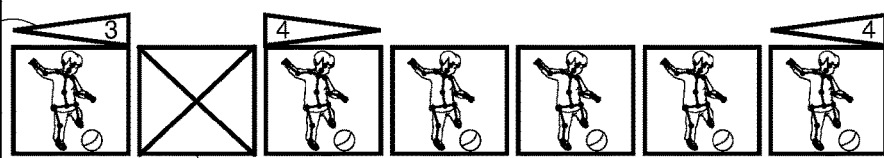
FIG. 9B

1000

| GRADE LEVEL | STUDENTS >> ABC ELEMENTARY >> 1ST >> DOE, JOHN |
|---|---|

> 1ST GRADE
> DOE, JOHN
> DOE, JANE
> NTH GRADE

SORT BY...

DOE, JOHN
AGE: 8
GRADE: 1ST
ID #: 000202486
PARENT CONTACT:
SUSAN@DOE.COM

HEIGHT: 50"
WEIGHT: 115 LBS
PRESIDENTIAL SCORE: 88
ALERTS: MISSING ASGMT

| JOINTS 1001 | ANGLE 1003 | BENCHMARK 1005 | SCORE 1007 | STANDARD 1009 | IMPACT 1011 |
|---|---|---|---|---|---|
| JOINT_1: | ----- | ----- | ----- | ----- | ----- |
| JOINT_2: | ----- | ----- | ----- | ----- | ----- |
| JOINT_3: | 150 | 160-180 | 93.75 | KICK3.1.2 | HIGH |
| JOINT_4: | ----- | ----- | ----- | ----- | ----- |
| JOINT_N: | ----- | ----- | ----- | ----- | ----- |

JOINT_3

KICK BALL >> PLANT-AND-LOAD 1015  1013  1017  1010  FIG. 10  1008  1006  1012

PHYSICAL EDUCATION KINEMATIC MOTOR SKILLS TESTING SYSTEM

FIELD OF TECHNOLOGY

This specification relates generally to testing and monitoring systems. More specifically, the disclosure pertains to a kinematic motor skills testing system.

BACKGROUND

Motion tracking hardware and software have been developed and are utilized in numerous industries (e.g., video gaming, medicine, three-dimensional animation, physical rehabilitation) and countless products (the Microsoft® Kinect®). However, current motion tracking derivative products leave the physical education and sports disciplines with much to be desired. Current systems that can track and analyze complex human movement cannot be used except by trained specialists in the fields of exercise science, biomechanics, kinematics, or other fields. Current systems require exhaustive video analysis and on-screen measurement tools and/or the concerted effort of video observation and individual body sensors to determine what is occurring with the human body during a specific movement task. Some systems require special attire tracked by infrared camera to detect joints in three-dimensional space. In any case, current systems are expensive and provide raw data that would be useless for most end-users of a motor skills testing system (e.g., a physical education coach).

The Society of Health and Physical Educators (SHAPE America) provides national content standards for physical education that guides the state content expectations for all 50 states. These standards are rich with resources outlining essential skills that students need to become physically literate, but do not provide any empirical method for assessing whether students are meeting the expectations set forth by organizational bodies. That is to say, there is no consistent, repeatable testing method for physical education due to the subjectivity of human perception when assessing the proficiency of another human's motor skills.

Thus there exists a need for kinematic motor skills testing system that is objective, consistent, reliable, non-invasive, cost-effective, and easily used by non-specialists.

SUMMARY

In accordance with the foregoing objectives and others, exemplary kinematic motor skills testing systems are disclosed herein. The described embodiments describe an arrangement of data processing devices executing instructions to provide solutions to the above deficiencies in the prior art.

In one aspect, a computer program product may be encoded on one or more non-transitory computer storage media of a computing device. The computer program product encompasses a series of instructions that are executable by a processor of the computing device. Executing the instructions causes the computing device to perform certain operations. Said operations involve receiving motion sensor data from a motion sensor communicatively coupled to the computing device. The motion sensor is adapted to generate motion sensor data associated with a subject performing a motor skill activity. The operations also involve comparing motion sensor data to benchmark data to determine one or more temporal phases of the motor skill activity. Furthermore, the comparison is utilized to determine a score representing a proficiency of a subject in performing the motor skill activity.

In another aspect, a system includes a motion sensor communicatively coupled to a computing device. The computing device stores instructions in one or more non-transitory computer storage media. The one or more non-transitory computer storage media store instructions that when executed by a processor of the computing device cause the computing device to perform certain operations. Said operations involve receiving motion sensor data from a motion sensor communicatively coupled to the computing device. The motion sensor is adapted to generate motion sensor data associated with a subject performing a motor skill activity. The operations also involve comparing motion sensor data to benchmark data to determine one or more temporal phases of the motor skill activity. Furthermore, the comparison is utilized to determine a score representing a proficiency of a subject in performing the motor skill activity.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9B is an exemplary phase view screen of the application.

FIG. 10 is an exemplary performance data screen of the application.

DETAILED DESCRIPTION

Figure 1:
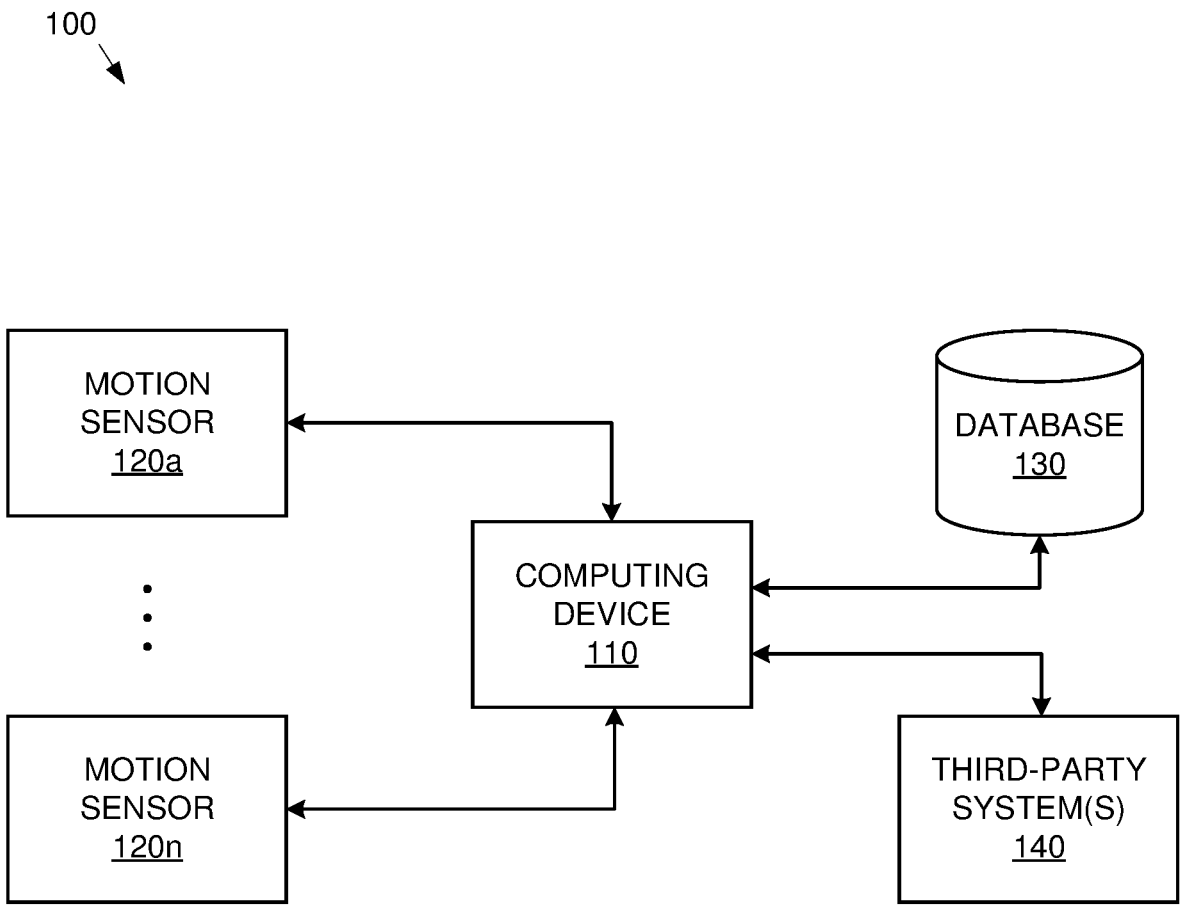
FIG. 1 is a block diagram that shows an exemplary kinematic motor skills testing system.

Disclosed are various methods, systems, and apparatuses, including computer programs encoded on computer storage media, for testing the kinematic motor skills of a subject, such as a physical education student. The disclosed embodiments may comprise a computing device executing an application stored thereon which may process body-joint angle data generated through one or more motion sensors communicatively coupled to the computing device.

While the subject performs a particular activity, the motion sensor captures body-joint angle data during one or more phases of the activity. The beginning and ending points of the one or more phases may be determined by the computing device or manually by a user of the computing device. For each phase, the application performs a statistical comparison between body-joint angle data and pre-established values or ranges (hereinafter 'benchmark data') to determine the subject's proficiency in the activity. The benchmark data may be associated with a minimum required proficiency and/or may comprise varying levels of proficiency.

The application provides a detailed analysis of the subject's skill progression which may be used by an end-user of the application (e.g., a physical education instructor, a personal trainer) or the subject to help improve the subject's score through practice. Finally, the application provides an interactive practice environment that allows the user to engage with the subject in more meaningful ways. The user will be well-equipped to assist the subject in achieving proficiency by following recommendations provided by the application based on the system's biomechanical analysis of the subject's test and practice data.

Overall, the described system combines aspects of database management, subject testing, data collection, data analysis, and interactive training features to provide solutions to the above-discussed disadvantages of the known prior art. In some embodiments, the system may provide the user a plurality of user-friendly interfaces through the application, allowing the user to access stored subject data, test the subject's kinematic motor skills to generate subject data, analyze and error-check the subject's kinematic motor skills data, and help the subject practice kinematic motor skills without the need for extensive training in physiology, biomechanics, or any sports-related sciences.

Definitions

'Benchmark data' refers to data that define a range of acceptability for various joints throughout various phases of a motor skill activity. The 'range of acceptability' may refer to a binary determination of biomechanical acceptability (e.g., is the knee in the right position?, does the hip rotate?) or a gradation of biomechanical acceptability (e.g., a range of acceptable values with a maximum and a minimum; a weighted skill progression with an emphasis on accuracy or power). Benchmark data includes quantitative and qualitative data, which can be compared to joint orientations derived from motion sensor data to calculate scores.

'Activity' refers to the performance of any motor skill, including but not limited to locomotor, non-locomotor, manipulative movement and psychomotor skills.

'Skeleton data' or 'body-joint data' or 'joint orientation' all refer to qualitative or quantitative representations of the orientation of any joint. Such data may be presented in relative or absolute terms, such as relative angles or absolute angles.

'Presidential score' refers to a score determination based on the FitnessGram® fitness testing assessment tool provided by the Cooper Institute.

'Proficiency score' refers to a quantitative and/or qualitative description of a subject's level of fitness for a particular activity. Fitness can be determined by measuring how accurately the subject's body-joint data compared to the benchmark data.

'Composite score' refers to a score determination based on the compiled results of multiple methods of testing, fitness standards, and assessment tools.

'Relative angle' refers to an angle formed between the longitudinal axes of two adjacent body segments articulating at a joint.

'Absolute angle' refers to an angular orientation of a single body segment with respect to a fixed line of reference.

'Body part' or 'joint' refers to any part of a skeleton and includes, but is not limited to the spine, hips, shoulder center, shoulders, neck, elbows, wrists, hand tips, thumbs, knees, ankles, feet, head, and eye sockets.

'Motion sensor' refers to a device having one or more sensors particularly suited for detecting the precise motions (i.e., ranges and/or values of the position and/or orientation) of particular body parts or joints of a skeleton in three-dimensional space. As such, the motion sensor may also be referred to as a 'depth sensor.' The device may incorporate sensors integrated into a multi-purpose device or in the case of a stand-alone device, further comprises a processor, a memory, and input/output facilities.

System Overview

Referring to FIG. 1, an exemplary kinematic motor skills testing system 100 is illustrated. As shown, the system comprises a computing device 110 communicatively coupled to any number of motion sensors (120a, 120n). Exemplary computing devices include, but are not limited to, general purpose computers, desktop workstations, laptops, cell phones, smart phones, personal digital assistants, televisions, tablets, and the like.

In one or more embodiments, the computing device 110 may be adapted to receive motion sensor data from any of the motion sensors 120a-n and determine, record, and/or transmit information for an end-user of the computing device 110 (e.g., a physical education teacher, a martial arts trainer, a personal trainer). The computing device 110 may store received or determined information in, for example, a database 130, which database 130 may incorporate one or more storage devices (i.e., volatile memory and/or nonvolatile memory). The database 130 may be embodied within the computing device 110, a separate computing device communicatively coupled to the computing device 110, or one or more third party system(s) 140 communicatively coupled to the computing device 110.

In one embodiment, the database 130 or an additional database may be a storage device of third-party system(s) 140, such as a remote server accessible through a cloud platform, or any networked computing device accessible through a network (e.g., a local area network (LAN), a wide area network (WAN), or another type of network). In any case, the third-party system(s) 140 may employ at least one processor, at least one memory, and at least one network interface for enabling network communication through the network, and may receive database queries from the computing device 110 to view, create, modify, and/or delete data in the database 130. In the case that the computing device 110 and the third-party system(s) 140 each operate independent databases, the databases may manually or be made to periodically share certain data, such as organizational information, subject information, health-related information, and other information.

Examples of applicable third party systems 140 include cloud storage systems (e.g., Dropbox, Google Drive, Box), social media networks (e.g., Facebook, Twitter, LinkedIn, MySpace), fitness/athletics applications (e.g., MyFitnessPal, Coach's Eye, Hudl), video sharing platforms (YouTube, Vimeo) and others.

The computing device 110 may generate and store detailed kinematic motor skills data (i.e., bone-joint orientation, video data, depth data, skills analysis, etc.) and may communicate all, some, or none of such information to the third-party database. In any case, the computing device 110 may integrate seamlessly into third-party databases, especially those that exist within the same organization (e.g. a school administration). In the case of multiple databases stored in one or more organizations, the computing device 110 may synchronize data with other databases and define a level of user access (e.g., administrator user, regular user) to synchronized data through the application settings (see FIG. 6 at 607).

Figure 2:
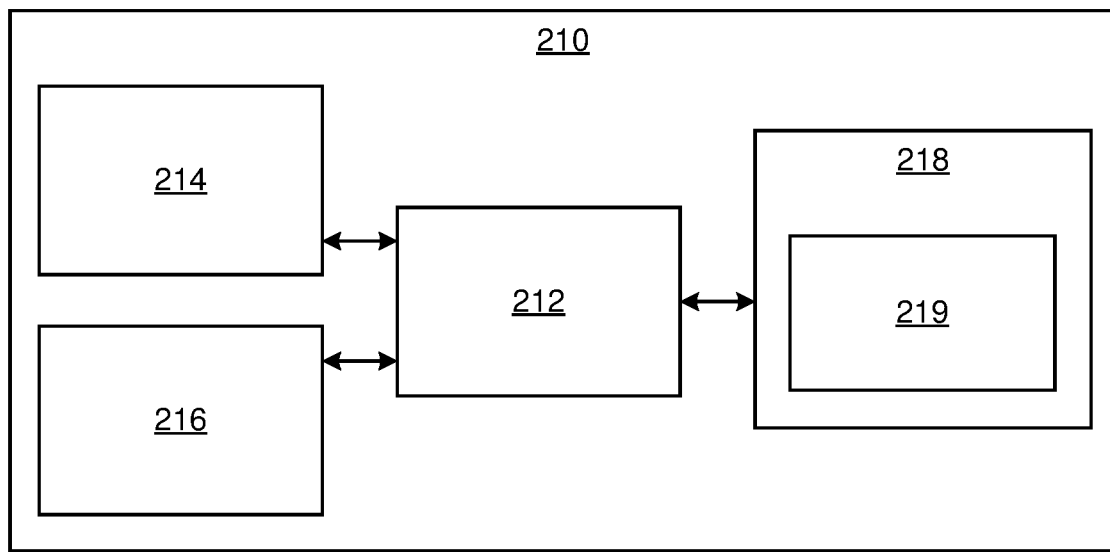
FIG. 2 is a block diagram that shows an exemplary computing device of the kinematic motor skills testing system.

Referring to FIG. 2, an exemplary computing device 210 of the kinematic motor skills testing system 100 is illustrated. The computing device 210 comprises one or more display modules 214, one or more user input interfaces 216, one or more processor modules 212, and one or more memory modules 218. Additional modules may include an input/output device, motion sensors, and/or audio equipment. The computing device may have a kinematic motor skills testing application 219 stored in its memory module(s) 218 and executable by the processor module 212.

Motion Sensors and Bone-Joint Detection

Figure 3:
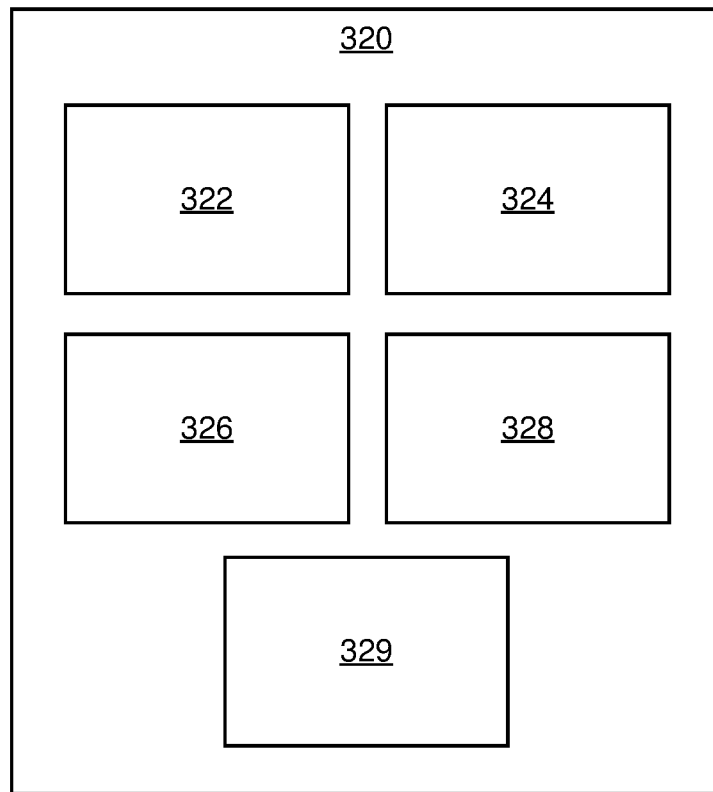
FIG. 3 is a block diagram that shows an exemplary motion sensor of the system.

Referring to FIG. 3, an exemplary motion sensor 320 of the kinematic motor skills testing system 100 is illustrated. The motion sensor 320 may comprise a camera 322, an IR emitter 324, an IR sensor 326, one or more processor modules 328, and one or more memory modules 329. The motion sensor 320 may additionally comprise one or more microphones.

In one or more embodiments, the motion sensor 320 generates video camera data through the camera 322, which video camera data comprises a depth image. The depth image is determined, for example, by emitting infrared (IR) beams through the IR emitter 324, receiving the reflection of the IR beams through the IR sensor 326, and, based on the size and/or shape of the reflected IR beams, generating, through the processor module(s) 328, a depth image comprising depth data (per pixel distance to nearest object). Please see U.S. Pat. No. 8,400,494, titled "Method and system for object reconstruction," which utilizes this concept. Though IR embodiments of the motion sensor are described herein, other wavelengths of light may also be used. Alternately, collimated light (e.g., lasers) may also be used.

In one or more embodiments, the motion sensor 320 detects the angles of joints. For example, the Microsoft® Kinect® sensor provides joint angles in two forms: a hierarchical rotation or an absolute orientation. A hierarchical rotation may be provided which may be the amount of rotation in 3D space (i.e., rotation along X, Y, and Z axes and/or within X, Y, and Z planes) from a parent bone to a child bone. In other words, hierarchical rotation is based on the joint's relationship to related bones, starting from the center of the skeleton (e.g., at the spine) and expanding outward to the child bone. An absolute rotation may be measured with reference to static origin, such as at the hip center joint. For more details about how joint angles are determined through an exemplary motion sensor, please see, for example, the Kinect™ for Windows® Software Development Kit (SDK). It will be appreciated by one of ordinary skill in the art that other motion sensors may use different techniques to generate a depth image and/or determine bone orientation and that any such motion sensors may be utilized in the embodiments disclosed herein. For example, the motion sensor 320 may also be configured to measure relative angles between bones articulating at a joint.

The motion sensor 320 may be configured to detect a particular set of joints that determine skeletal structure. In one embodiment, the motion sensor 320 is adapted to detect one or more joints of the human body, selected from the group consisting of: middle/center spine, left/right hip, shoulder center, left/right shoulder, neck/head, left/right elbow, left/right wrist, left/right hand, left/right hand tip, left/right thumb, left/right knee, left/right ankle, left/right foot, the head, and the eye sockets. The motion sensor 320 may be adapted to detect more or fewer joints, depending on the activity performed by the subject or the type of motion sensor 320 used. Alternately, the motion sensor 320 may be adapted to detect the bodily structure of a non-human organism, such as a dog or a horse (i.e., vertebrates) or such as an insect or jellyfish (i.e., invertebrates).

Activity Phases and Benchmark Data

In one or more embodiments, the system collects bone-joint data at a particular or variable frequency during one or more phases of an activity and compares the data against benchmark data to determine a proficiency score for that activity. The one or more phases may be detected based on a predetermined model for the particular activity stored in the memory of the computing device or the memory of the motion sensor. For example, an overhand throw may involve the following known phases: ready position, stride, arm cocking, and release.

Since in each phase specific joints of the body must be uniquely positioned or oriented (in some cases allowing for some margin of error), such positions/orientations may be detected by the motion sensor/computing device as markers for beginning and/or end points for the phase. In one embodiment, the phases may be detected based on predicted periods of time each phase may take. For example, an overhand throw may take a total estimated time of 1500 milliseconds. That time may be equally split into four, 375-millisecond segments (ready position, stride, arm cocking, and release). Or, certain phases may be known to take longer than others, and so the phases may be split accordingly.

In another embodiment, the phases may be detected based on a deterministic model of testing. A deterministic model fits the needs of motor skill testing because motor skills involve predictable, repeatable, and testable movements that can be measured and determined, e.g., by the system described herein. The model may comprise data that may be utilized by the motion sensor 320 to delineate changes in the subject's body movement(s) that mark the transition between the one or more phases. For example, to determine whether the subject is properly approaching an object, the position of a subject's center of mass may be measured relative to the front and back feet. When approaching an object, the center of mass should be substantially centered above the front foot, indicating a forward lean.

Observing the phases and variables involved in a particular activity requires parsing an amount of data that is overwhelming for a human observer. For example, an overhand throw may comprise five phases: a ready position phase, a stride phase, an arm cocking phase, a release phase, and a follow-through phase. The start time of the ready position phase may be associated with pulling a ball or throwing a hand backward. Such a joint-orientation signature or marker is easy to identify from the motion sensor data, and so the system can quickly identify the start and end times of each of the above phases. Once start and end times are determined, motion sensor data within each phase is compared against benchmark data to determine scores.

To determine a score for the ready position described above, measurements of the subject's axial skeleton, hip, knees, and center of mass may be derived from the motion sensor data and compared against benchmark data. Other positions may involve other joints, which would be similarly measured and compared against benchmark data to generate corresponding scores. These comparisons make up the foundation of the system's objective approach to determining motor skill activity proficiency.

For example, for the subject's axial skeleton during the ready position, an acceptable range of angles for the spine and the head in the sagittal plane may be +10 degrees to −170 degrees from the vertical axis (i.e., if the subject is facing to the right). At these angles, the body is in a position that is biomechanically advantageous for the overhand throw. For values outside this range, percent deductions can be made from the overall score. For example, if the angle is 2% outside the minimum or maximum values, the overall score may be reduced by 2%. During the ready position phase, the score may be similarly affected by the orientation of the right and left thighs in the sagittal and frontal planes, the right and left knees in the sagittal plane, the right and left elbows in the sagittal and frontal planes, the right and left upper arms in the sagittal plan, and the position of the center of mass.

In the short span of one phase (the ready position phase), at least 14 calculations are made. It is not humanly possible to parse the data for the ready position phase, let alone four other phases involving even more complex calculations of various joints at various angles. An overhand throw occurs in mere seconds, but the amount of calculations needed to objectively determine a subject's proficiency at the overhand throw is insurmountable to a naked eye observer. For the overhand throw example, a total of five phases involves identifying start and/or end times for each phase, and making 84 specific joint angle measurements.

The number and type of phases of an activity depends on the complexity of the activity and/or whether the activity involves locomotor, non-locomotor, or manipulative movements. Locomotor movements generally include, but are not limited to, even rhythm movements (e.g., walking, running, hopping, skipping, leaping, and jumping) and uneven rhythm movements (e.g., galloping, skipping, sliding). Non-locomotor movements or axial movements include, but are not limited to, bending, flexing, stretching, extending, lifting, raising, twisting, rotating, swinging, swaying, turning, shaking, and wiggling. Manipulative movements include, but are not limited to, throwing, catching, hitting, dribbling, kicking, punting, and volleying.

Data gathered during a phase and compared to benchmark data can include joint data or activity-specific data. Joint data may comprise joint angle data in a particular plane (frontal, sagittal, transverse, parasagittal), which may be subsequently compared to an absolute or relative angle during analysis. Joint data may also comprise qualitative and/or quantitative descriptions of movements in specific joints or limbs, include but not limited to flexion/extension, abduction/adduction, elevation/depression, rotation, pronation/supination of the wrist, dorsiflexion/plantar flexion of the ankle, inversion/eversion of the feet, occlusion/protrusion/retrusion of the jaw, nutation/counternutation of the sacrum, and opposition of thumbs and other fingers. Additionally, joint angle data may be used to approximate the subject's center of mass at any given point.

Activity-specific data may comprise one or more particular movements of one or more particular joints and/or limbs throughout one or more phases of the activity. Activity-specific data include, but are not limited to: footprint distance, pattern of foot placement, velocity/acceleration of movement(s), joints remaining static between phases, symmetry/asymmetry in limb movements, presence of single or double limb support, whether the subject was in flight, whether/how the subject approached an object, whether the subject was in a ready position, proper arm cocking, proper release of an object, proper follow through, proper leg planting/loading, and contact with an object.

In one embodiment, the system may be configured to favor one or more specific data types and/or one or more joints during any particular phase of an activity. For example, during the ready position phase of an overhand throw, the left and right hips may not contribute significantly to the proficiency score, but during the stride phase, an abduction of 5-15 degrees may be biomechanically advantageous and thus required to achieve a degree of proficiency.

The benchmark data may comprise specific values or ranges (i.e., maximum/minimum values) for joint angle data to be compared to. This allows for a significantly more objective and precise testing environment that has a clear advantage over subjective standard testing programs designed by current standard-setting organizations, such as SHAPE America. SHAPE America's standards material interpreting acceptable motor skills consists of vague descriptions of body movement based on responses to equally vague movement cues provided by, for example, a physical education teacher. Its dependence on the objectivity of an untrained human technician causes SHAPE America skill testing to fail to provide a consistent, reliable, and repeatable approach to calculating fine motor skill development.

The present system effectively eliminates user subjectivity by empirically collecting bone-joint data and comparing it against predetermined values and ranges of acceptability. Thus, a user of the system is freed from the intensive, error-prone labor of measuring/calculating data and can focus her attention on engaging the subject to improve her skills through the aid of the system, and specifically, through one or more modules and/or user interfaces of the kinematic motor skills testing application.

Kinematic Motor Skills Testing Application

Figure 4:
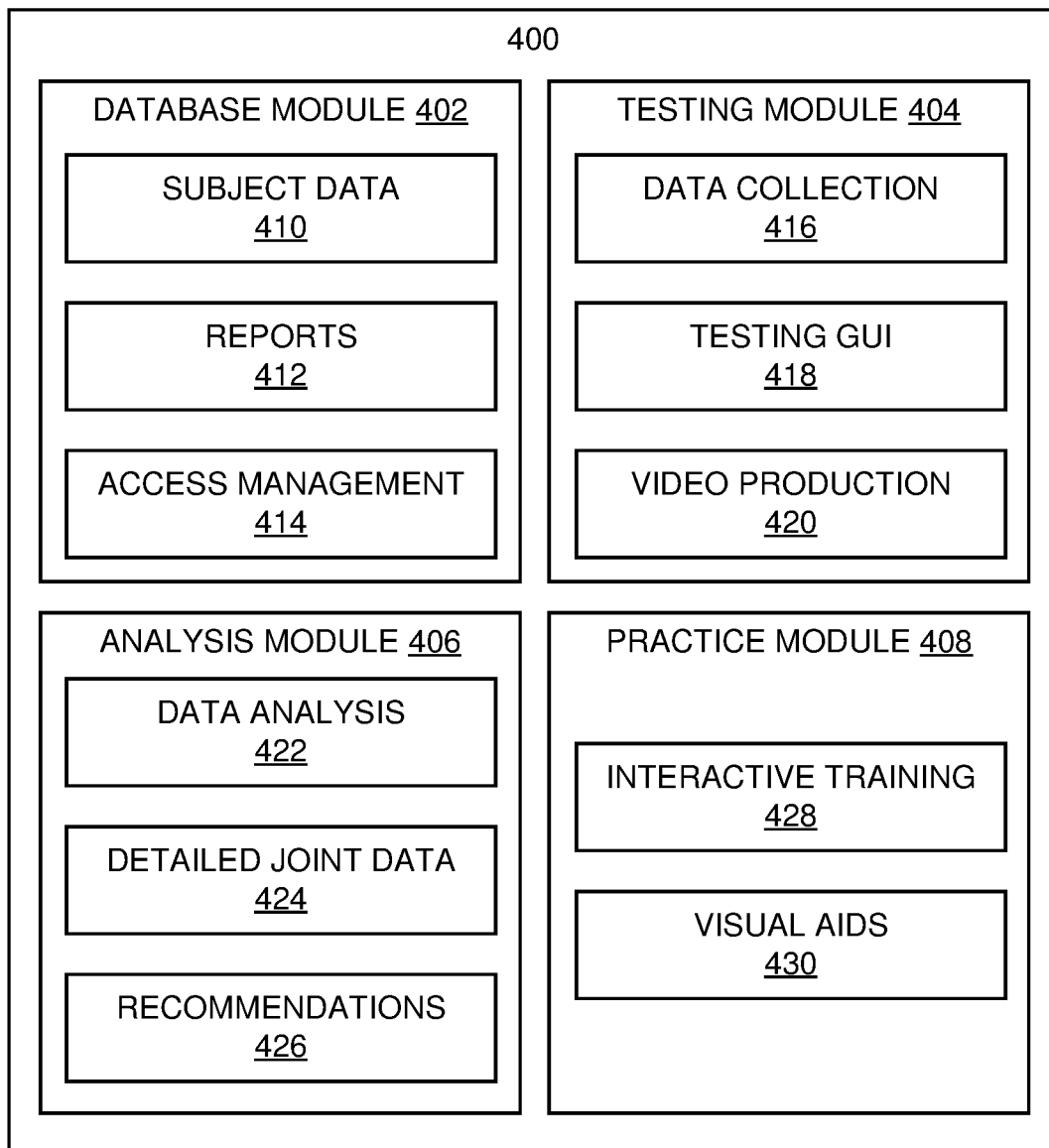
FIG. 4 is a block diagram that shows a number of integrated modules of a kinematic motor skills testing application.

Referring to FIG. 4, a block diagram is presented showing a number of integrated modules 402-430 of an exemplary kinematic motor skills testing application 400. As shown, the application 400 may comprise a database module 402, a testing module 404, an analysis module 406, and a practice module 408.

The application 400 may comprise a database module 402, which is generally adapted to allow the user to store and organize subject data 410, generate and access reports 412, and manage third-party access 414 to subject data. The database module 402 may utilize any conventional database structure and schema to organize said data. For example, the data may be organized in rows and columns, like in a .csv (comma separated values) file. Alternately, the database module 402 may utilize any database query language (e.g., MySQL, PostgreSQL) to query, create, update, or delete data organized in the database as a group of relational tables. Alternately, the database module 402 may store data in a spreadsheet format. In any case, subject data may be organized according to the names and unique identifiers associated with subjects to be tested through the application 400. Furthermore, the database module 402 may provide varying degrees of access to different users. For example, an administrator user may be able to modify student data and export skills test results, whereas an instructor user may only be able to conduct a skills test.

The application 400 may also comprise a testing module 404, which is generally adapted for data collection 416 (i.e., collecting data from one or more sensors, storing the data for later analysis), displaying raw sensor data through a testing GUI 418 (e.g., overlaying joint position and/or bone orientation on a video stream), and may provide video production 420 features (e.g., capturing video, editing video). In one or more embodiments, the testing GUI 418 is adapted to allow the user to view a video feed of the motion sensor(s), record data (e.g., video data, audio data, skeleton tracking data, depth data), and ease the process of batch testing a plurality of subjects.

The application 400 may also comprise an analysis module 406, which is generally adapted to allow a user to view recorded subject data, perform an analysis 422 of recorded subject data, view past analytics, view detailed joint data 424 for particular activities, and provide recommendations 426 for follow-up testing.

In one or more embodiments, the analysis module 406 analyzes subject data for a particular activity by comparing the three-dimensional coordinates and orientation of the subject's joints over time to benchmark data for that particular activity and determining a score that quantifies the subject's proficiency at performing that particular activity. For example, if the proper range for a motor skill like jumping is a maximum flexion of 80 degrees on the preparation phase of the jump (according to benchmark data) and the user displays an angle of 50 degrees, then his score in that area would be affected proportionally. Generally, benchmark data provides a range of acceptability for the orientations of particular joints throughout one or more phases of an activity. Comparisons between said orientations and said ranges of acceptability for those orientations during various phases of an activity are used by the system to determine the subject's proficiency in that activity.

The application 400 may also comprise a practice module 408, which is generally adapted to provide interactive training 428 for the subject to improve her skills through guided instructions and visual aids 430.

Figure 5:
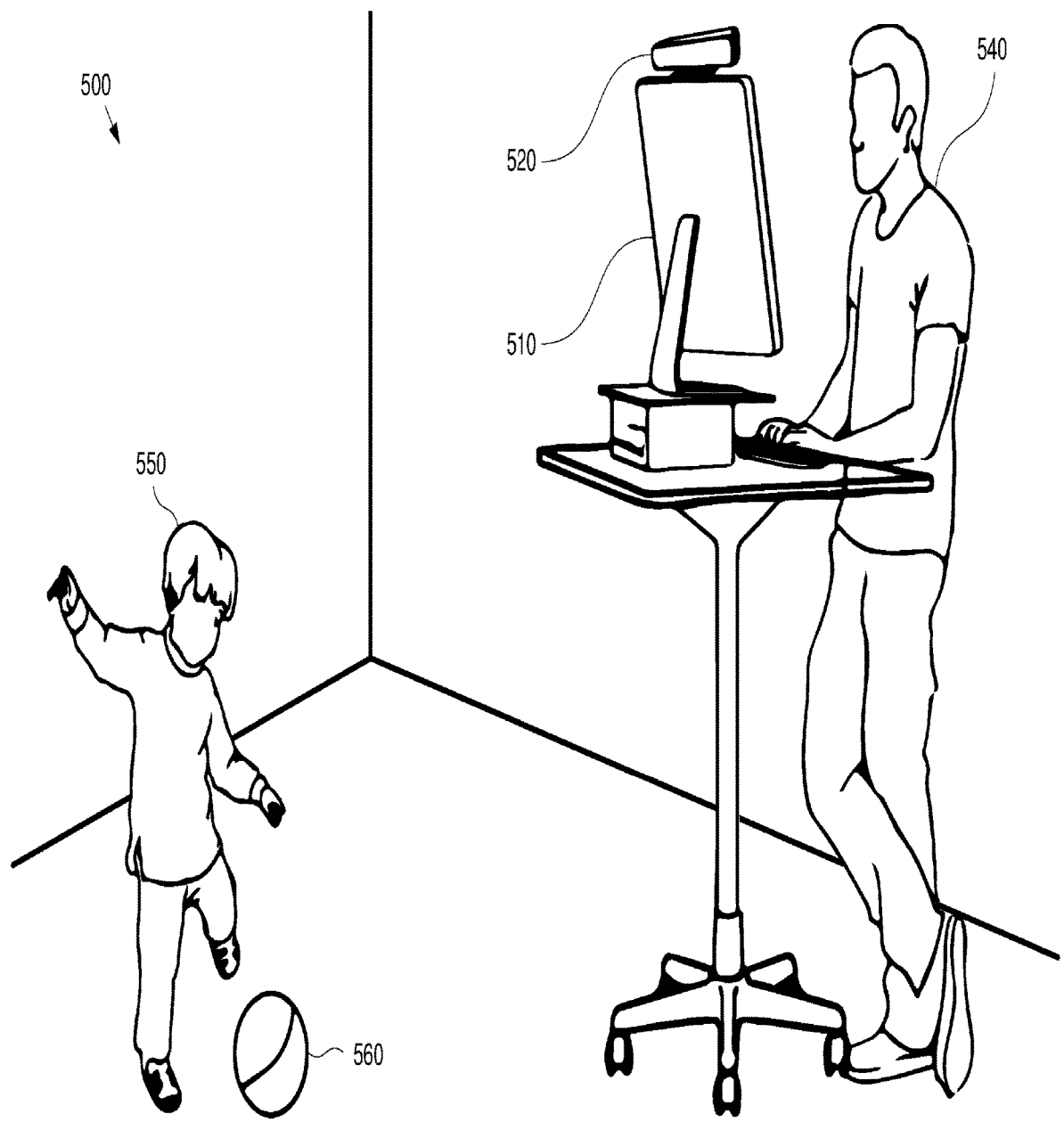
FIG. 5 is a schematic diagram showing an exemplary demonstration of one embodiment of the system.

Referring to FIG. 5, an exemplary demonstration of one embodiment of the kinematic motor skills testing system 500 is illustrated. The kinematic motor skills testing system 500 may be utilized, for example, in a physical education instruction setting. A computing device 510 of the system may store in a memory thereon a kinematic motor skills application executable by a processor of the computing device 510. An end-user 540, such as a physical education instructor may manipulate the computing device through one or more applications, including the kinematic motor skills application, to aid a subject 550 (e.g. a physical education student) in testing the subject's kinematic motor skills (e.g., kicking a ball 560).

The computing device 510 may receive one or more data streams from a motion sensor 520 pointed substantially at the subject 550. Among other functions, the motion sensor 520 determines body-joint orientation at a high frequency, generating rich data that can be statistically compared by the processor executing application instructions to benchmark data to qualitatively and/or quantitatively calculate subject's skill scores. The motion sensor 520 may also detect inanimate objects having three-dimensional geometry, such as the ball 560. This enables the application to assess the subject's skill in manipulating the inanimate object, for example, the subject's form while kicking the ball 560, as shown in FIG. 5. The system may also detect, for example, when the ball 560 leaves the subject 550 and determine body-joint data at the time of the ball's release.

In an alternate embodiment, the system may utilize additional motion sensors, which, if arranged at particular angles in the testing space, may allow for a greater field of view and data collection rate. For example, the Kinect™ sensor has an effective field of view of 5 meters deep by 4.5 meters wide.

A single such sensor would not allow for a subject to be thoroughly tested during locomotor patterns that require the subject to travel long distances, such as a linear distance of 15-30 ft. However, a multi-sensor setup may allow for bone-joint orientation to be recorded throughout the entire range of motion of the joint, wherever the subject is during the activity. Thus, utilizing multiple sensors can allow for more complete collection of bone-joint data, especially when more complex skills (e.g., psychomotor skills, manipulative movements) are being tested, and especially when multiple angles are used to capture motion sensor data.

For example, whereas one motion sensor may detect bone-joint orientation on the side of the subject's body that is facing the motion sensor, another motion sensor may be positioned such that it detects bone-joint orientation on the other side of the subject's body. Or, for example, multiple motion sensors with adjacent (or overlapping) fields of view may track bone-joint orientation as the subject passes through the adjacent (or overlapping) fields of view. In another example, particular motion sensors may be trained on particular anatomical planes, such as the subject's sagittal or frontal planes.

The above-described multi-motion sensor embodiments effectively increase the frequency of data capture. For example, a Kinect sensor collects data at a rate of around 30 frames per second. A second sensor would effectively double the amount of frames captured. A multi-sensor setup may allow for more complex skills to be recorded at any number of angles. Additional sensors would increase the resolution of data collection, allowing for more complex analysis of the subject's aptitude during and/or after testing of said complex skills.

Additionally, a multi-sensor embodiment allows for recorded data to be visualized and manipulated in unique ways. For example, 360-degree coverage of the subject 550 may enable the application to generate a rotatable avatar of the subject that may be utilized by the user 540 to pinpoint key joints for improvement.

In one or more embodiments, one or more motion sensors may be used for one or more subjects. For example, one motion sensor may be used for a plurality of subjects (up to a limit in some cases—for example, the Kinect supports up to six); multiple motion sensors may be used for a single subject (e.g., capturing data from numerous angles, capturing data throughout an activity that exceeds a single motion sensor's field of view); one motion sensor may be used for a single subject; or multiple motion sensors may be used for multiple subjects.

User Interfaces

Figure 6:
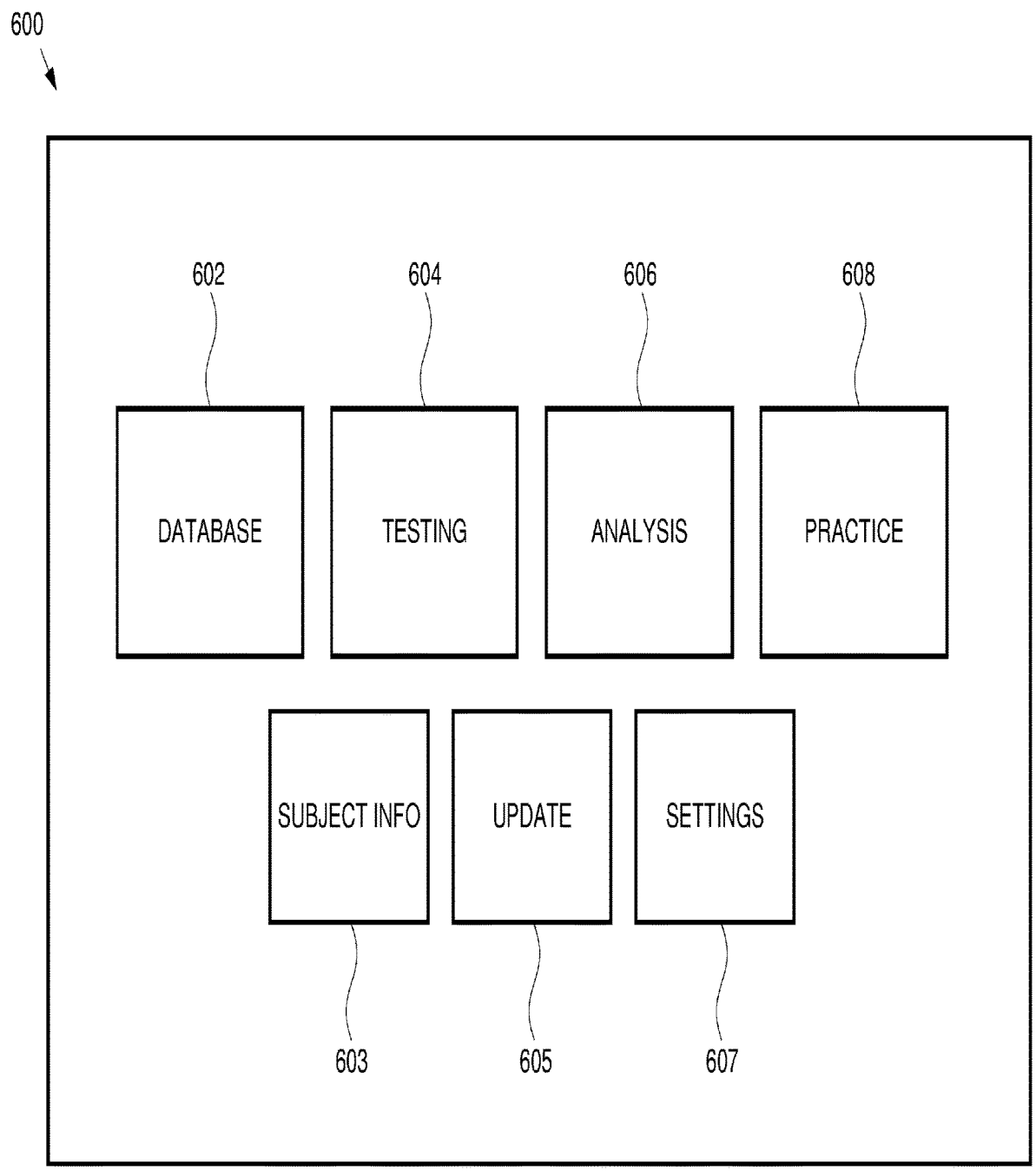
FIG. 6 is an exemplary dashboard screen of the application.

Referring to FIG. 6, an exemplary navigation screen 600 of the kinematic motor skills testing application 400 is shown. As shown, the navigation screen 600 provides a number of links to various screens of the application, including links to: a database interface 602, a testing interface 604, an analysis interface 606, and a practice interface 608. The navigation screen 600 may also provide additional links to additional screens of the application, including links to: a subject information interface 603, an update interface 605, and an application settings interface 607.

Figure 7:
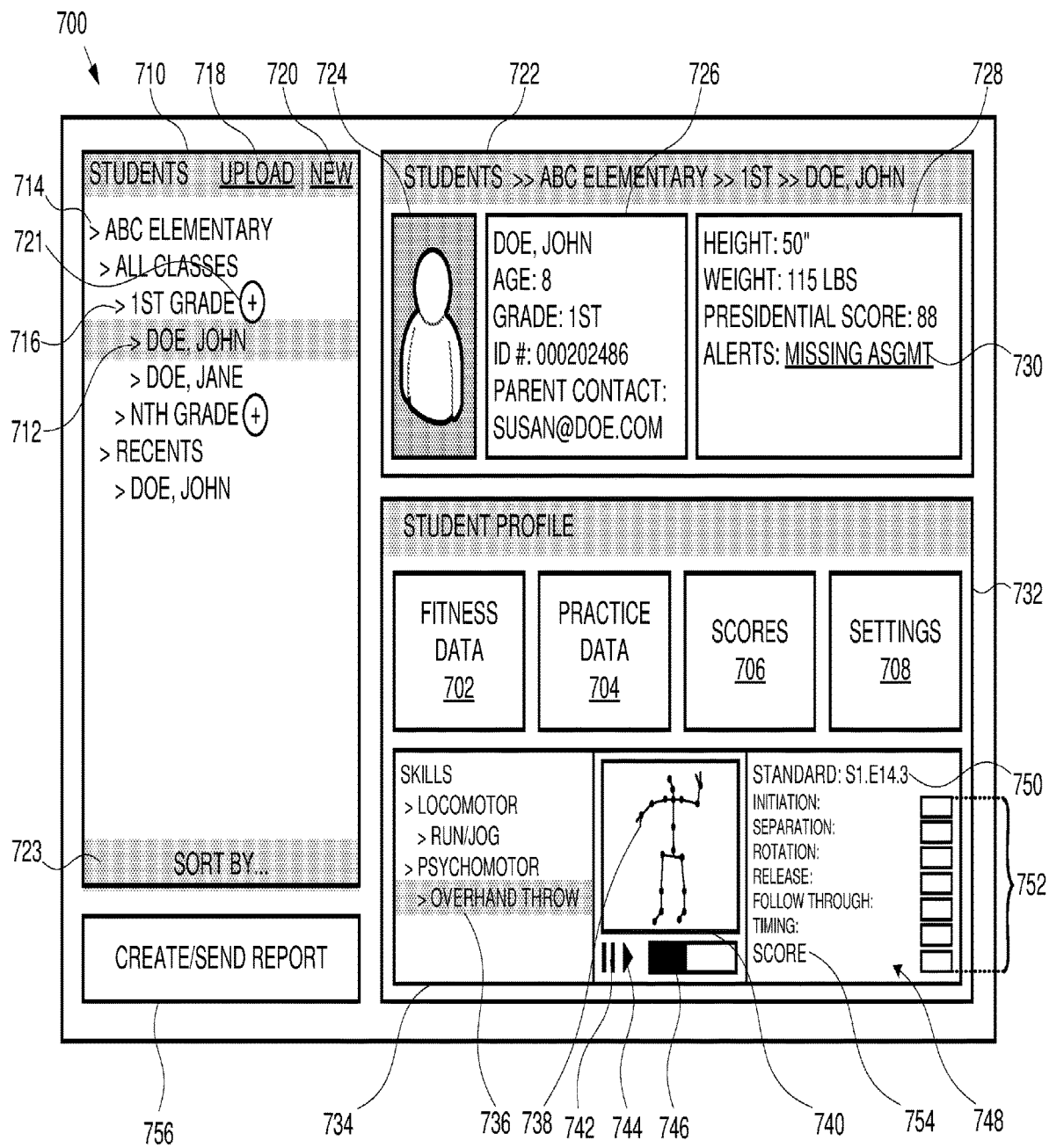
FIG. 7 is an exemplary database screen of the application.

Referring to FIG. 7, an exemplary database screen 700 is illustrated. This screen may be accessed by, for example, choosing the "Database" option presented on the navigation screen 600 (see FIG. 6 at 602). The database screen 700 allows users to access various data associated with particular subjects, such as fitness data 702, practice data 704, and scores 706 associated with, for example, one or more students of a particular physical education class. The database screen 700 also allows users to access various settings 708 for particular subjects.

As shown in FIG. 7, the database screen 700 comprises a subject search section 710 which allows users to select subjects 712 (e.g., students, patients, research participants) from particular organizations 714 (e.g., an elementary school, a school district, a fitness center, a research center), and particular groups 716 in said organizations (e.g., n-th grade class, research cohort, fitness group). The organizational structure of subjects 712 shown in the subject search section 710 shows an exemplary list suitable for an educational organization, but a person of ordinary skill in the art would appreciate that other organizational structures are within the scope of the embodiments described herein. It would also be appreciated that any structural element (e.g., the subject search section 710) of the database screen 700 and any other interface screen shown in the drawings and described herein may assume a different position, size, and appearance and comprise different content or sub-elements therein. And no such structural element is necessarily drawn to scale.

The subject search section 710 allows users to upload new subject data to the application. For example, the subject may utilize an upload button 718 to upload subject data in any format, including CSV (or other delimited format), XML, SQL update, or utilize any other method of uploading data into a database. In one embodiment, data may be typed or copy-pasted in a text box and the application may recognize a pattern for delimiting particular subjects and particular types, fields, and hierarchies of subject data.

The subject search section 710 also allows users to add particular subjects to specific groups. For example, new students can be added by selecting a new subject button 720, or new students can be added directly to a group by selecting an add user button 721.

The subject search section 710 also allows users to sort the subjects by, among other fields, name, teacher, grade (e.g. Pre-K to 12th, primary, secondary), missing assignment, high/low score by selecting a sort by button 723. Other filters may be provided based on the type of organization using the application (e.g. a school, a gym, an intramural team), the setting where the application is used (e.g., yoga studio, gymnasium, obstacle course), or program for which the application is used (e.g., physical education testing, personal training regimen, university research study).

The database screen 700 also shows a subject information section 722, which comprises a photo 724 of the subject, general information 726 associated with the subject (e.g., name, age, grade, ID #, parent contact), and health-related information 728 (e.g., height, weight, presidential score, composite score, alerts).

Alerts shown in the health-related information 728 may provide a link 730 to access a message or action item associated with the alert. For example, a missing assignment link 730 may be provided to the user and when selected, may open up a corresponding interface (i.e., the testing interface of FIG. 8) for completing the missing assignment. Alerts may also be provided in the case that certain general or health-related information is missing for the selected subject. Alerts may also be provided in the case that follow up testing is required for a particular subject.

Selecting a particular subject in the subject search section 710 (e.g. John Doe 712) causes the database screen 700 to display subject data in the subject information section 722. Selecting the particular subject also causes the database screen 700 to display a number of profile data navigation options in a student profile section 732 of the database screen 700. Said navigation options include links to view various profile details in a results section 734, such as fitness data 702, practice data 704, scores 706, and subject settings 708.

Selecting fitness data 702 may display the subject's current progression in learning a motor skill selected from a skill selection section 736 of the results section (e.g., overhand throw). The results section 734 may also display a video of an avatar 738 performing the selected skill (i.e., overhand throw) in a video preview 740 of the results section 734. The video preview 740 may be accompanied by playback control buttons (e.g., a pause button 742, a play button 744) and a progress bar 746 showing the progress of playback for the video. The progress bar 746 can be utilized to resume playback at a particular frame or loop through a particular group of frames.

Selecting fitness data 702 or practice data 704 may cause a data section 748 of the results section 734 to show, for example, the subject's progression through a series of benchmarks or proficiency standards. Such progression information may include, but not be limited to, a current standard 750 at which the subject is performing, the elements 752 of the standard 750, a description of the standard 750, a description of the elements 752 of the standard 750, and if available, the subject's performance for the standard 750 and/or any applicable elements 752 of the standard 750. Additionally, a proficiency score 754 for the standard 750 may also be provided.

Selecting practice data 704 may display practice metrics (not shown) for the subject, including, but not limited to: practice results for skills selected from the skills selection section 736, frequency of practice sessions, sample video previews of past practice sessions through the video preview 740, recommended practice sessions (e.g., based on past practice performance, based on fitness data progression), and feedback/results for past practice sessions.

Selecting scores 706 may display scores (not shown) for past testing and practice sessions for the subject. Scores may be shown for particular skills selected in the skills selection section 736 or for particular elements of any standards the subject is progressing through.

Lastly, selecting settings 708 may allow the user to modify any of the subject info, such as the photo 724, the general information 726 and/or the health-related information 728. Also, the user may make corrections to any of the fitness data 702, practice data 704, and/or scores 706 associated with the subject. Additionally, the settings 708 may be utilized to manipulate access to the subject's data. For example, the user may provide an external contact (e.g., a parent contact) with read-only access to the subject's data.

The database screen 700 may also allow the user to create and/or send reports to internal contacts (e.g., school faculty, administrative team) or external contacts (e.g., parent of subject, subject's spouse). This feature may be accessed by selecting the create/send report button 756 The report may encompass the fitness data 702, practice data 704, and/or scores 706. The report may also comprise an attachment, such as a video preview, a .gif animation with or without sound, an infographic, or a digital pamphlet. For example, the subject may be a student and the user may be a physical education teacher. The user may send a report to the subject's parent with information about the subject's latest practice data results. Or the user may send the parent a report with information about future and/or follow-up testing and how to prepare the subject. Any such report may be made recurring.

In an alternate embodiment, the create/send report button 756 may allow the user to export the subject data to other external sources such as, but not limited to, a printer, a third-party system such as MyFitnessPal, Google Fit, Apple Watch, state and/or national education associations, research institutions, and/or state and/or federal government organizations or agencies. Centralized aggregation and reporting of subject data can help to generate consensus data across multiple organizations, improve community best practices, regularly inform subjects of their skill progression, and aid patients progress through physical therapy.

For example, the create/send report function may be used by a physical education teacher to upload videos of students' performing skills to a state compliance entity as 'proof' of the student's motor skill progress. Or the export function may be used to report data to other stakeholders, such as parental contacts or the larger physical education community to improve public health and standardize the process of student assessment across various schools.

Figure 8:
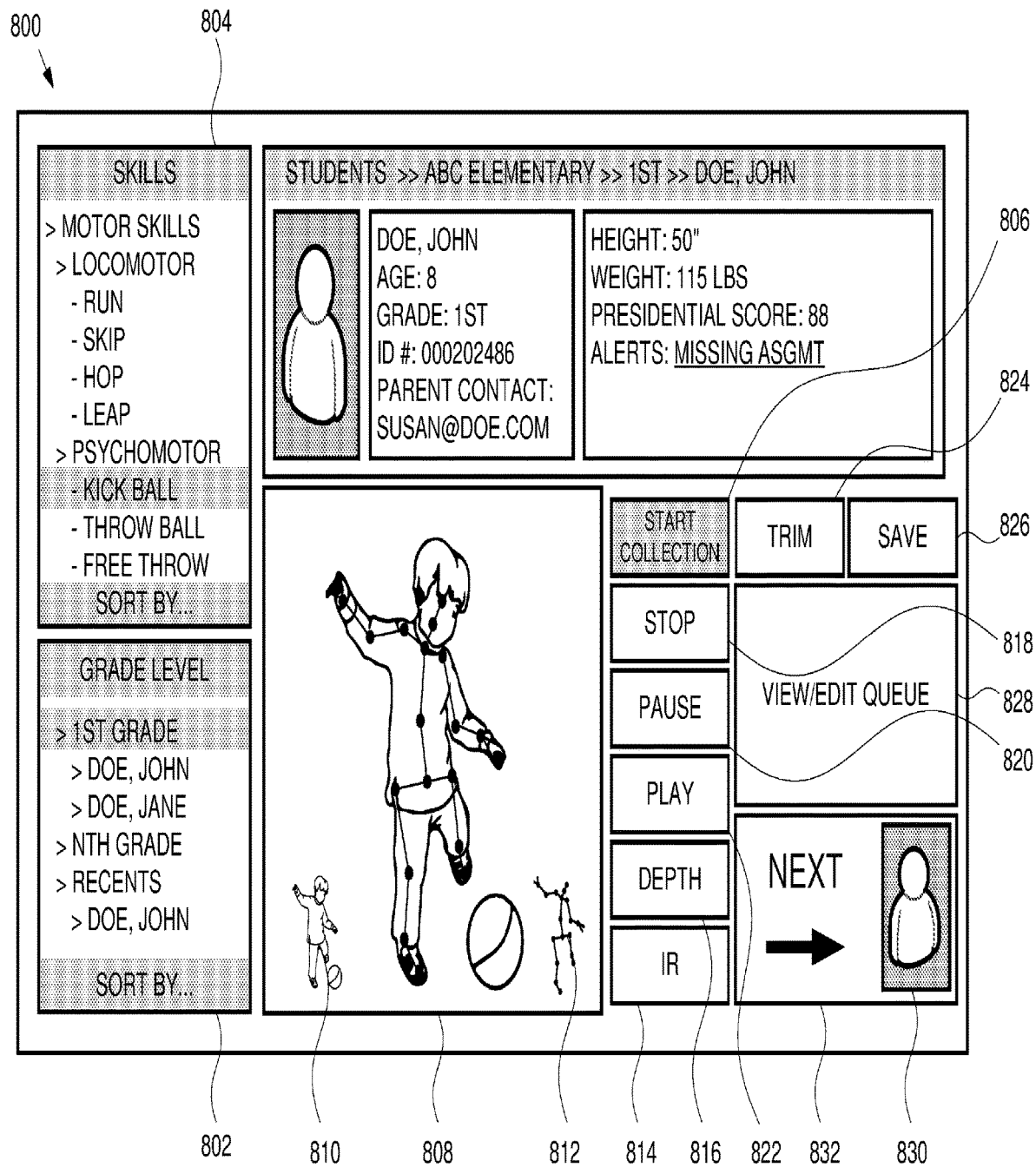
FIG. 8 is an exemplary testing screen of the application.

Referring to FIG. 8, an exemplary testing screen 800 is illustrated. This screen may be accessed by, for example, choosing the "Testing" option presented on the navigation screen (see FIG. 6 at 604). The testing screen 800 is generally adapted to allow users to collect subject data for any number of subjects throughout one or more phases of a particular activities and view raw data during collection. During such data collection, body-joint data is measured and stored for simultaneous or later analysis (i.e., for determining subject proficiencies). Overall, the testing screen 800 is ideal when there is a large user-subject ratio—the testing screen 800 facilitates efficient and rapid testing regardless of the user's computer literacy.

As shown, the testing screen 800 comprises a subject search section 802 (similar to FIG. 7 at 710). By selecting one or more subjects or one or more groups of subjects through the subject search section 802, the user may select which subjects to test. The skills for which the subject(s) are being tested may be chosen by the user through a skill selection section 804 of the testing screen 800 (similar to FIG. 7 at 736). The testing screen 800 also comprises a subject information section (similar to FIG. 7 at 722).

The options provided in the subject search section 802 and the skill selection section 804 may be sorted by the user. For example, the subject search section 802 also allows users to sort the subjects by, among other fields, name, teacher, grade (e.g. Pre-K to 12th, primary, secondary), missing assignment, high/low score. Other filters may be provided based on the type of organization using the application (e.g. a school, a gym, an intramural team), the setting where the application is used (e.g., yoga studio, gymnasium, obstacle course), or program for which the application is used (e.g., physical education testing, personal training regimen, university research study).

The skill selection section 804 also allows users to sort the skills by, among other fields, the type of skill to be tested (e.g., locomotor, psychomotor, non-locomotor, manipulative), particular proficiency standards or benchmarks associated with certain skill(s), and particular sports or similar activities associated with one or more skills. Other filters may be provided based on the type of skills available to be tested through the application, the age of the subject(s), the maturity level of the subject, and the program through which the subject is being trained.

Once the subject(s) and skill(s) to be tested are selected by the user, the user may proceed to start a data collection session by selecting a "Start Collection" button 806. During the data collection session, a video preview 808 of the testing screen 800 may display one or more raw data streams generated by the motion sensor. For example, the video preview 808 may display an RGB video stream generated by the motion sensor and communicated to the computing device. Or, the video preview 808 may display a skeleton of the subject based on the body-joint data collected by the motion sensor. The skeleton may comprise lines for bones and dots for joints. Or, the video preview 808 may display an infrared view of the video stream. Or, the video preview 808 may display a depth map, in which objects further away from the sensor are colored in contrast to objects that are closer to the motion sensor.

Controls may also be provided for the user to choose which of the above data streams (e.g., RGB video, skeleton, IR view, depth map) are displayed in the video preview 808. For example, the user may select an RGB video button 810 to toggle the display of the RGB video. Or, the user may select a skeleton button 812 to toggle the display of the skeleton overlay. Or, the user may select an IR button 814 to toggle the display of the IR view. Or, the user may select a depth button 816 to toggle the display of the depth map.

These data streams may be used by the user to more effectively test the subject's performance. For example, the skeleton overlay may assist in determining an imbalance between various joints during the preparation phase of a jump. Or, for example, bone-joint orientation may be used to prevent a subject from being physically injured due to inversion of shoulders during heavy weight lifting.

It will be appreciated that the motion sensor and the computing device may comprise fewer/additional/different sensors and/or utilize different algorithms for collecting other data. And such data may be useful in analyzing any aspect of the subject's performance. Additionally, the above data streams or other potential data streams may be shown in different formats. For example, the depth map may be shown in the form of contrasting colors or as text (distance per pixel). Or, a numerical description for the angle of a joint may be shown. Or, specific joints in the skeleton overlay may be selected to view detailed orientation description in real-time or near real-time.

The testing screen 800 also provides the user a number of video playback buttons, such as stop 818, pause 820, and play 822. Any of the above data streams collected and recorded through the testing screen 800 may be associated with metadata, such as the subject tested, a timestamp, a frames per second, and other parameters, any of which may be provided at the time of data collection or later. The stored data may be viewable later through the database screen 700 or the analysis screen 900. In any case, the user may manipulate the recorded data streams through the one or more editing tools. For example, during recording or if the recording is paused, the user may select a trim button 824 to trim a video. This may be useful to, for example, remove undesired footage (e.g., due to a false start or a malfunctioning sensor). The user may also select a save button 826 to save the data collected during the data collection session.

During a data collection session, one or more subjects may be tested simultaneously or sequentially through one or more motion sensors. The number of simultaneously testing subjects may depend on the skill being tested or the configuration of the computing device and/or the application. For example, if the user is testing the subjects' ability to kick a ball, each subject may be tested singly using a single motion sensor. An additional sensor may be used to collect additional data that may be used for deeper analysis of subject performance. Or, an additional sensor may be used to collect data for other subjects that are being tested for the same or different skill(s). In all multi-sensor and/or multi-subject embodiments, the testing screen 800 may display a separate video preview for each activity being tested. Since each activity may involve any number of subjects, the video preview may highlight which subjects are involved and the application may test and determine proficiencies of any of the subjects.

Before or during a data collection session, the user may view and/or edit a queue of subjects to be tested by, for example, selecting a view/edit queue button 828 of the testing screen 800. Through the view/edit queue button 828, the user may proceed to sort the subjects in the queue by alphabetical order, by gender, or any other sequence.

As shown in FIG. 8, the proficiency of a particular group of subjects (i.e., the first grade at ABC Elementary) for a particular skill (i.e., kicking a ball) may be tested. A preview of the next subject to be tested may also be shown through the testing screen 800. The preview may display a photo 830 and/or a name of the next subject. Once the current subject's testing is completed, the user may select a next button 832 or the next subject's photo 830 to continue testing the next subject. Once selected, the next subject's photo 830 and information will populate the corresponding sections of the testing screen 800. The first subject's test data may be automatically saved or manually saved by the user by, for example, selecting the save button 826.

Figure 9A:
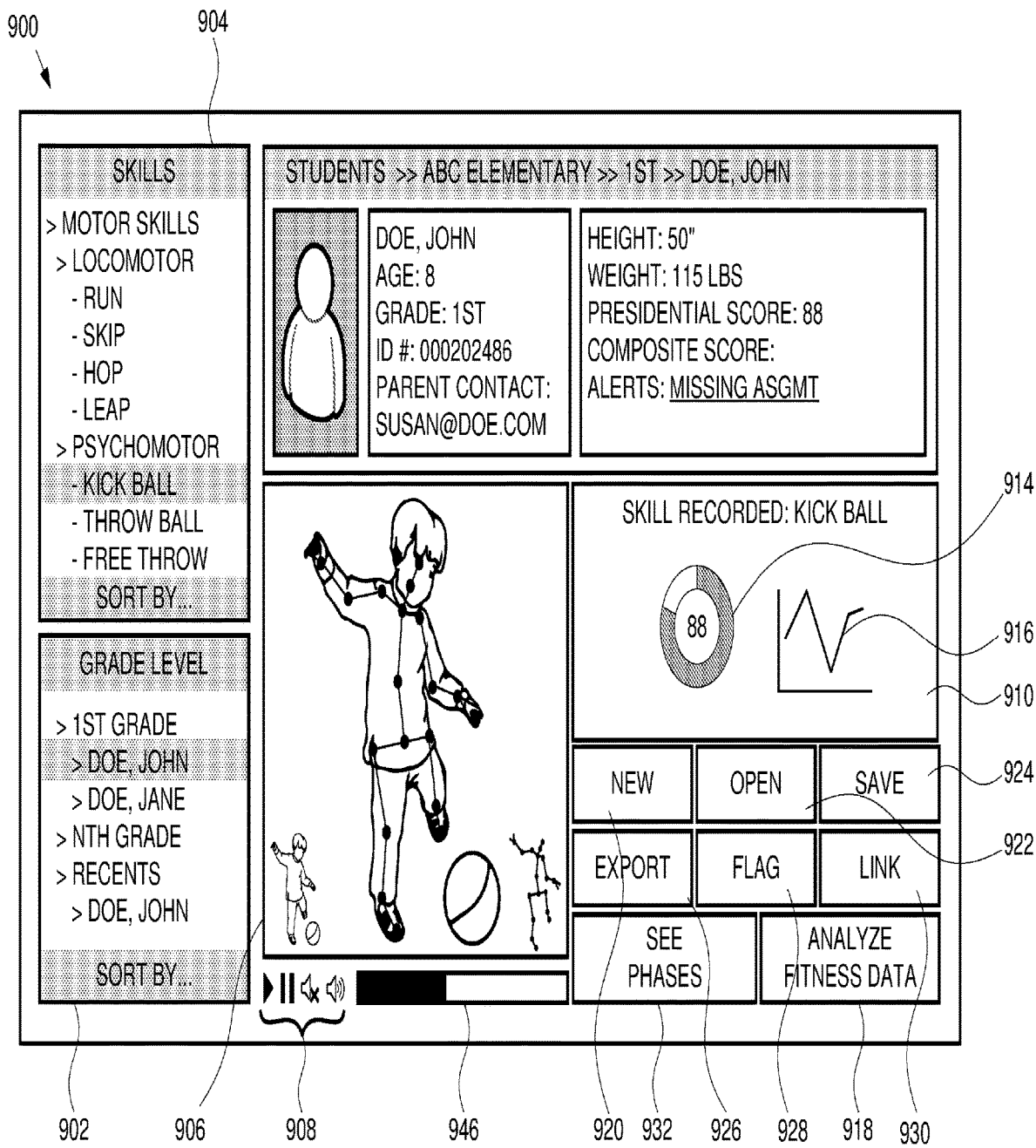
FIG. 9A is an exemplary analysis screen of the application.

Referring to FIG. 9, an exemplary analysis screen 900 is illustrated. This screen may be accessed by, for example, choosing the "Analysis" option presented on the navigation screen 600 (see FIG. 6 at 606). Alternately, this screen may be accessed through the database mode by, for example, selecting fitness data (see FIG. 7 at 702), practice data (see FIG. 7 at 704), and/or scores (see FIG. 7 at 706). Generally, the analysis screen 900 allows users to view a subject's specific fitness data, practice data, and scores. The analysis screen 900 also provides a detailed analysis of individual data points captured by the motion sensor during the above described data collection session.

As shown in FIG. 9, the analysis screen 900 comprises a subject search section 902 (see FIG. 7 at 710), a skill selection section 904 (see FIG. 8 at 804), a video preview 906 (see FIG. 8 at 808), playback controls 908 for the video preview 906 (e.g., play, pause, mute volume, modify volume), subject information section (see FIG. 7 at 722), a skill breakdown section 910, and a variety of tools 920-930 for interacting with the information provided through the analysis screen.

To show skill data for a particular skill, a skill may be selected from the skill selection section 904 and a subject or subjects may be selected from the subject search section 902 to display associated motor skill data and analysis in the skill breakdown section 910. For example, as shown in FIG. 9, the user may wish to view the application's analysis on John Doe's proficiency at kicking a ball.

The skill breakdown section 910 may display the subject's level of proficiency through various formats or aides. For example, the proficiency for the selected skill may be shown as a numerical score 914. The numerical score 914 may be a qualitative or quantitative representation of the proficiency. For example, the numerical score 914 may be a percentage comparing the subject's bone-joint data to benchmark data. Furthermore, the numerical score 914 may incorporate one or more sub-scores issued for each temporal phase during performance of the skill.

Areas of improvement may be listed or illustrated through one or more visual aids or representations. For example, the proficiency may be shown as a circular graph around the numerical score 914. The proficiency may also be shown as a line graph 916 or bar graph that may show the accuracy of each joint that is applicable to the selected skill. Or, the line graph/bar graph 916 may indicate specific areas of improvement (i.e., joints that the subject should prioritize practicing to raise the corresponding skill's proficiency score). Other visual aids illustrating the score or providing a different interpretation of the score are within the scope of the exemplary embodiments described herein. These visual representations may be included in any data exported to another user or a third-party.

In one embodiment, the numerical score 914 (and/or subscores) representing the subject's proficiency at the particular skill may be calculated based on a percentage of accuracy compared to benchmark data. In another embodiment, the score calculation may utilize a deterministic model of hierarchical scoring in which, for a given phase of a given activity, particular joint(s) contribute more significantly to the score than other particular joint(s). For example, when an overhand throw is scored, the rotation of a subject's hips and position of the subject's drive leg contribute to power development much more than rotation/position of the subject's plant leg. Thus, inaccurately orienting the hips and/or the drive leg would adversely affect the subject's overhand throw score more than a malorientation of the plant leg would. Furthermore, the system may alert the user that the proper movement of subject's hips and drive leg are potential areas of improvement.

During specific phases of an activity, the assessment of certain joints may contribute more significantly to the overall proficiency score than other joints. For example, for a motor skill like the underhand toss, it is considered ideal for the subject to step forward with the foot opposite the hand that is throwing the object. In assessing a subject's proficiency in performing the underhand toss, the system may place more weight on the appropriate orientation of the hip joint rather than, for example, the knee joint of the leg. Essentially, if the foot is not stepped forward, this is far more important to the underhand toss than an also inappropriate, but much less vital, bend in the knee. This feature of the system takes the guesswork out of the instruction process—the regular layperson operating the system generally does not have the biomechanical understanding and/or patience to pore over the astronomical amount of data generated by the motion sensor and pinpoint every displaced or disoriented joint in every phase of every subject's activity.

This model of scoring is reliable, repeatable, and produces consistent results when applied to motor skills testing. This is because all motor skill activities generally have predictable phases and involve predictable movements which can be tracked and scored effectively through the system.

The user may also utilize file editing tools 920-930 to create a new 920 testing session (subsequently causing the testing screen 800 to be shown for the selected subject and the selected skill), open 922 the results of any past testing session for the selected subject and the selected skill, and save 924 any changes made to the subject data. Additionally, any data may be exported through an export tool 926 (see FIG. 7 at 756), flagged by the user for later review through a flag tool 928, or shared with an external contact or third-party system through a link tool 930.

In one embodiment, for a particular subject, the beginning and end points of one or more various phases may be incorrectly determined. In one embodiment, the system may utilize a phase detection algorithm that utilizes signal processing to detect and correct errors (e.g., anomalous frames) in the video data stored for the given activity.

Selecting a 'See Phases' button 932 for a particular activity may cause a phase view screen 934 to appear, as shown in FIG. 9B. This screen shows the various phases 936 of the activity as determined by the system. This screen may also be accessed after starting a data collection session (see FIG. 8 at 806). As shown in FIG. 9B, the video preview 906 showing the subject may be shown with playback controls 908 and progress bar 946.

The phase view screen 934 allows the user to view and/or adjust one or more phase markers 936a-n. Adjusting phase marker(s) 936a-n modifies the start and/or end times of particular phases of the activity captured in the video. The minimum increment for a phase marker may be one frame.

As shown in FIG. 9B, various frames 938 of the video may be displayed in a sequential manner from left to right and top to bottom. Phase marker 936a represents a start time for a first phase of the activity. Phase marker 936b represents an end time for the first phase and a start time for the second phase. Phase marker 936c represents an end time for the second phase and a start time for the third phase. Phase marker 936 represents an end time for the third phase, which is followed by a missing or deleted frame 940. The missing or deleted frame 940 may be due to a malfunction in the video camera of the motion sensor or the result of an error correction algorithm incorporated within the system.

An exemplary error correction algorithm may utilize common signal processing functions, such as deleting frames that significantly statistically contradict contextual frames. For example, during the release of an overhand throw, a frame showing the subject's arm moving in a direct opposite that of the expected result would be deleted by the error correction algorithm. This type of error correction promotes data integrity and more accurate proficiency calculation.

In addition to error correction, the system may be able to determine when a subject is practicing only one phase. In such a case, the system may only identify phase markers associated with the start time and end time of a single phase of an activity or a single-phase activity. Additionally, the system may also determine when a subject is interjecting a pause between phases. In this case, a pause may be determined if the body-joint orientation associated with particular phase marker is recognized for a predetermined amount of time, e.g., 2 seconds. The system may delete or mark frames in which a subject is pausing between phases.

The user may also manually adjust the length of the phases by sliding the individual phase markers 936a-n to the appropriate location (i.e., between specific frames 938). The user may also slide combined phase markers apart (e.g., phase markers 936b-c) by selecting a start time portion (i.e., with one finger if using a touchscreen) and an end time portion (i.e., with another finger) and pulling the portions apart. This allows the user to space phases apart frame by frame. This may be necessary if the system is unable to detect errors in the video, pauses in the subject's activity or other reasons for spacing between phases. After making such changes, the user may select the 'save' button 924 to save the changes to memory (e.g., of the computing device).

Changing the beginning and end points of individual phases may allow for the appropriate joint data to be compared to benchmark data. For example, a certain joint's movement, such as the release of a hand, may be misassigned to the wrong phase, such as a follow through phase (i.e., instead of a release phase). The above embodiment provides for manual and automatic methods of correcting this mistake.

Referring back to FIG. 9A, the export tool 926 may be used to share any particular type of data to a third party system. For example, a video clip generated through the system may be uploaded to YouTube. Metadata for the video clip may also be provided, such as the name of the skill being performed, the name of the subject tested, and/or any recommendations from the system. In another embodiment, the export tool may allow the user to share data for individual subjects or classes. Such data may be shared in a CSV or other format.

Referring to FIG. 10, a performance analysis screen 1000 is illustrated. This screen may be accessed by, for example, choosing the "Analyze Fitness Data" button presented on the analysis screen (see FIG. 9 at 918). The performance analysis screen displays: a video preview 1002 of the activity (see FIG. 9 at 906); video playback tools 1003; bone-joint data for particular joints; an analysis table 1004 showing analytics for each joint; a joint map 1006 showing the location of the joint 1008; a description 1010 of the joint 1008, and a radar graph 1012 that breaks down performance according to the phases of the activity.

The analysis table 1004 may show in-depth joint data for one or more joints 1001 during a phase 1017 of an activity 1015 selected by the user through the skill selection section 904 of FIG. 9. The activity 1015 (e.g., kicking a ball) and the phase 1017 (e.g., plant-and-load phase) of the activity 1015 may be displayed in an activity and phase selection box 1013.

The analysis table 1004 may show specific detail for each of the joints 1001 involved in testing the subject's proficiency during the phase 1017 of the activity 1015. Specific detail includes, but is not limited to, an angle 1003 of the particular joint 1001 (e.g., an absolute angle of 150 degrees, a reference angle of 20 degrees in relation to another joint), a benchmark range or value 1005 corresponding to the joint 1001 (e.g., 160-180 degrees), a score 1007 for the individual joint (e.g., 93.75%), an indicator of the relevant standard 1009 (e.g., KICK3.1.2), and a quantitative description and/or qualitative description 1011 (e.g. HIGH) of the effect on overall score.

In a particular phase of an activity, the individual joint score 1007 may be calculated based on statistical differences between actual joint data collected during that phase (e.g. 1003) phases and the benchmark data 1005. For example, the proper benchmark 1005 range of angles for a planted knee (i.e., the joint 1008) for an activity 1013 a such as kicking a ball may be a minimum flexion of flexion of 160 degrees to a maximum flexion of 180 degrees during a plant-and-load phase 1017 of the activity 1013. If the actual angle 1003 of the subject's right knee instead show a flexion of 150 degrees in the knee (i.e., knees are too bent), then the subject's score 1007 for the joint 1001 during the plant-and-load phase 1017 would be affected proportionally. In the example above, the subject's knee is 10 degrees away from the minimum value of the benchmark 1005, or off by 6.25%, so the subject's score for the jump may be adjusted down by 6.25%. The overall score 1007 of the plant-and-load phase 1017, assuming all angles 1003 for the remaining joints 1001 to be within benchmark range 1005, would be 93.75%.

In one embodiment, the analysis table 1004 may show data for all joints 1001. In another embodiment, the analysis table 1004 may show data for all joints 1001 having a high impact 1011 on the overall score for the phase 1017.

The joint map 1006 may allow the user to select any joint 1001 or joint displayed on of the joint map 1006 to highlight the scores that correspond to that joint. Additionally, selecting a joint on the joint map 1006 (e.g., joint 1008) or a joint 1001 in the analysis table 1004 may show a description 1010 of the joint (e.g., JOINT_3). The description 1010 may comprise a name of the joint, the type of joint, the function of the joint, the range of motion of the joint, and/or relevance to a standard (e.g., that the subject has been recently practicing).

The radar graph 1012 may illustrate scores for each joint 1001 (e.g., JOINTS_1-N as shown in the radar graph 1012 of FIG. 10) or for each phase (e.g., a plurality of phases A-F). Scores closer to the perimeter of the graph may be higher than scores closer to the center of the graph, or vice versa.

As the video preview 1002 is played back, the joint info provided in the analysis table 1004, the joint map 1006, the joint description 1010, and/or the radar graph 1012 may change based on the phase 1017 of the activity 1015 that is being shown, on the activity 1015 being shown, or on any of the joints that may be involved in the activity 1015 or the phase 1017. This dynamic display of joint data may be toggled on or off by the user.

Practice

Figure 11:
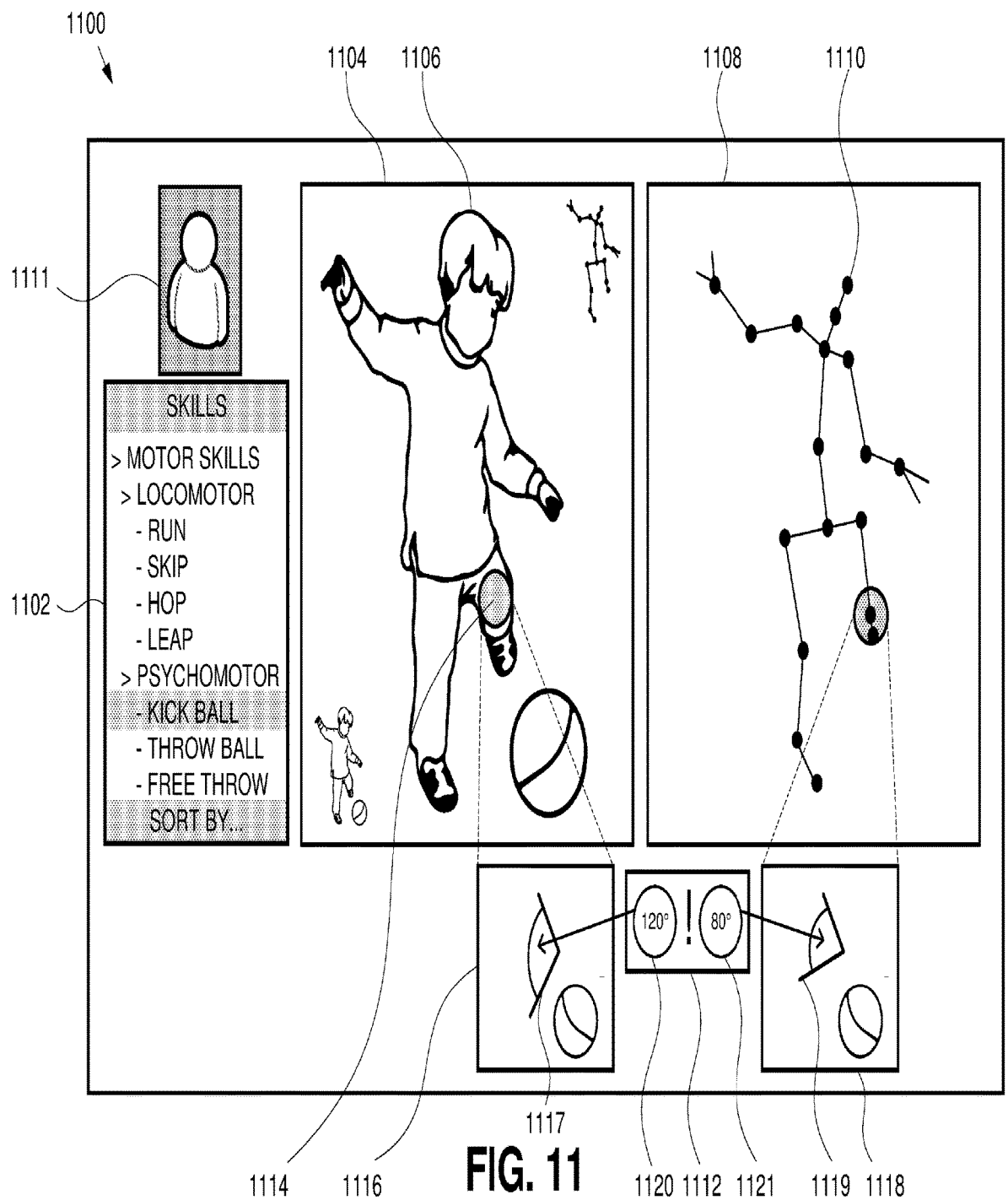
FIG. 11 is an exemplary practice screen of the application.

Referring to FIG. 11, a practice screen 1100 is illustrated. This screen may be accessed by, for example, choosing the "Practice" button presented on the navigation screen (see FIG. 6 at 608). Generally, the practice screen 1100 provides an interface for subjects to practice and improve motor skills.

The practice screen 1100 may be utilized by the user to aid the subject in practicing particular skills selected from a skill selection section 1102 (see FIG. 8 at 804). Alternately, the subject may be directly utilizing the practice screen 1100 to improve his/her motor skills (i.e., the user is the subject).

In one embodiment, the practice screen 1100 displays a video preview 1104 (see FIG. 8 at 808) of the subject 1106 performing the activity next to a benchmark video 1108 of an avatar 1110 performing the activity and modeling ideal biomechanics. In another embodiment, only the video preview 1104 of the subject 1106 may be shown. A photo 1111 of the subject 1106 may also be shown on the practice screen 1100.

The practice screen 1100 may issue an alert 1112. The alert 1112 may notify the subject of a discrepancy between the data underlying the video preview 1104 and the benchmark data underlying the benchmark video 1108. In one embodiment, the system may detect that a joint 1114 of the subject 1106 is not in an ideal position while in a plant-and-load phase of kicking a ball. Upon said detection, the system may display a frame 1116 through the practice screen 1100 showing an angle 1117 of the subject's joint 1114 (e.g., the knee) derived from the subject's body-joint data collected through the motion sensor (e.g., a motion sensor pointed orthogonally to the right side of the subject 1106) during said phase. The system may additionally display a frame 1118 showing a reference angle 1119 representing an ideal angle for the joint 1114. The alert 1112 may include a numerical degree value 1120 of the joint angle 1117 and/or a numerical degree value 1121 of the reference angle 1119. Additionally, the alert 1112 may comprise a written description of the discrepancy between the joint angle 1117 and the reference angle 1119. The alert 1112 may aid the subject in correcting his/her knee orientation when performing the kick again.

In another embodiment, the alert 1112 may provide different information. For example, the alert 1112 can display an instructional message (i.e., "bend your knee further before kicking"), provide a replay of a relevant portion of the benchmark video 1108, or provide a link to instructional or reference information.

Proper correction of the subject's activity performance can be assisted by the use of multiple alerts (e.g., alert 1112) displayed sequentially or in parallel. Though more than one alert may be displayed through the practice screen, the subject may not be able to make constructive progress if overwhelmed by too many alerts. As such, in one embodiment, the system may prioritize the alerts according to the most positive effect each alert's recommended correction will have on the subject's overall score for the activity, the phase, and/or the joint. As shown in FIG. 11, the alert 1112 notifies the subject of a significant discrepancy between actual knee position and ideal knee position. However, if the discrepancy was not as large, its correction may not have enough impact on the score to warrant an alert, i.e., the correction would not add that much power to the kick as compared to, e.g., proper twisting of the hips or orientation of the arms.

The practice screen 1100 provides as little distraction as possible to allow the subject to focus on his/her form during the activity. As such, certain elements of the practice screen 1100 may be removable from the screen, such as the skills selection section 1102, the photo 1111, the alert 1112, the frame 1116, and the frame 1118. As such, the bare minimum embodiments may comprise at least one of the group consisting of: the video preview 1104 (to allow the subject to observe and/or correct his/her own form) and the benchmark video 1108 (to allow the subject to observe and/or mimic ideal form). The hidden elements may automatically reappear as needed if certain events occur, such as if a new alert 1112 is issued in which the alert 1112 and the benchmark video would appear alongside the video preview 1104. Or the user may cause the hidden elements to reappear, by, for example, utilizing a peripheral device of the computing device.

Figure 12:
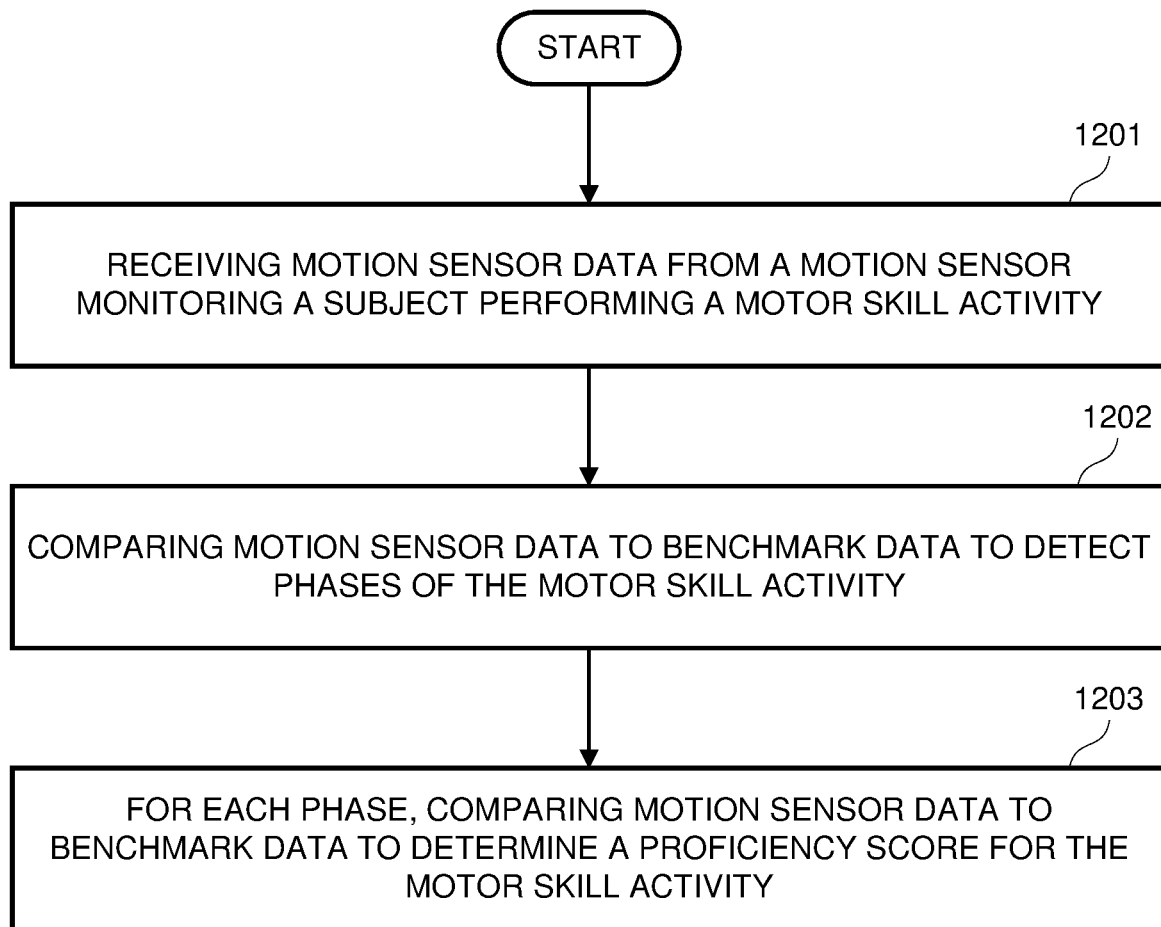
FIG. 12 is an exemplary method of determining a proficiency score.

Referring to FIG. 12, an exemplary method of determining a proficiency score is illustrated. In a step 1201, a computing device receives motion sensor data from a motion sensor adapted to monitor a subject performing a motor skill activity and generate the motion sensor data. In a step 1202, the computing device compares received motion sensor data to benchmark data to detect phases of the motor skill activity. In a step 1203, the computing device utilizes the comparison for each temporal phase to determine a proficiency score for the motor skill activity.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments. In this regard, directional terminology, such as "vertical," "horizontal," "top," "bottom," "front," "back," "left," "right," etc., is used with reference to the orientation of the drawing(s) being described. Because components of the embodiments can be positioned in a number of different orientations, the directional terminology is used for purposes of illustration and is in no way limiting.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer program product encoded on one or more non-transitory computer storage media, the computer program product comprising instructions that when executed by at least one computing device cause the at least one computing device to perform operations comprising:

receiving motion sensor data from one or more motion sensors communicatively coupled to a mobile computing device included by the at least one computing device, wherein the motion sensor data at least in part includes a RGB video stream and includes body joint data, and is associated with a subject performing a motor skill activity, and wherein the one or more motion sensors include or includes a camera, an IR emitter, an IR sensor, one or more processor modules, and one or more memory modules;

communicating the motion sensor data to a remote server accessible through a cloud platform so that the motion sensor data is stored at a database included by the remote server;

comparing the motion sensor data to benchmark data to detect temporal phases of the motor skill activity, wherein the comparing includes identifying, in the motion sensor data, one or more values of the motion sensor data that correspond to one or more markers of the motor skill activity that are among the benchmark data;

displaying, through a display screen of the mobile computing device, an interactive practice interface including a video preview showing a skeleton of the subject performing the motor skill activity, the video preview being based at least in part upon the RGB video stream and body joint data, and further including a plurality of frames corresponding respectively to different ones of the temporal phases; and determining, based upon at least one comparison of the motion sensor data associated with the temporal phases to the benchmark data, a score representing a proficiency of the subject for performing the motor skill activity.

2. The computer program product according to claim 1, wherein the body-joint data is associated with at least one position or at least one orientation of one or more body parts of the subject.

3. The computer program product according to claim 2, wherein the one or more body parts are selected from the group consisting of: spine, hips, shoulder center, shoulders, neck, elbows, wrists, hands, hand tips, thumbs, knees, ankles, feet, head, and eye sockets.

4. The computer program product according to claim 1, wherein the benchmark data comprise biomechanically advantageous joint orientation values or ranges for one or more body parts for each of the temporal phases.

5. The computer program product according to claim 1, wherein each of the temporal phases comprises a start time and an end time.

6. The computer program product according to claim 5, wherein the interactive practice interface provides
an ability to modify the start time or the end time of any of the temporal phases, and further includes a radar graph illustrating a plurality of subscores associated with the respective temporal phases, wherein the score is based at least in part upon the plurality of subscores associated with the respective temporal phases and based upon at least one comparison of the motion sensor data to the benchmark data.

7. The computer program product according to claim 1,
wherein for each temporal phase of the motor skill activity, the markers comprise a start time marker and an end time marker, and
wherein the comparing of the motion sensor data to the benchmark data to detect the temporal phases involves identifying, in the motion sensor data, the start time marker and the end time marker of each temporal phase of the motor skill activity.

8. The computer program product according to claim 1, wherein the
interactive practice interface additionally includes a video preview of an ideal performance of the motor skill activity, and one or more alerts indicating a discrepancy between the motion sensor data and the benchmark data.

9. The computer program product according to claim 1, wherein the motion sensor data and the benchmark data comprise position or orientation data for physical education activities, physical therapy activities, sports activities, or physiological research activities.

10. The computer program product according to claim 1, wherein the comparing of the motion sensor data to the benchmark data involves comparing the motion sensor data to a predetermined model, wherein the predetermined model indicates when each temporal phase begins and ends based on one or more of the markers associated with the performed motor skill activity, wherein the markers are joint orientation markers.

11. A system, comprising:
at least one computing device having at least one processor and one or more non-transitory computer storage media, wherein the at least one computing device includes a mobile computing device;
one or more motion sensors communicatively coupled to the mobile computing device,
wherein the one or more motion sensors is or are adapted to generate motion sensor data associated with a subject performing a motor skill activity, and wherein the one or more motion sensors include or includes a camera, an IR emitter, an IR sensor, one or more processor modules, and one or more memory modules;
wherein the one or more non-transitory computer storage media store instructions therein that when executed by the at least one processor of the at least one computing device cause the at least one computing device to perform operations comprising:
receiving the motion sensor data from the one or more motion sensors, wherein the motion sensor data at least in part includes a RGB video stream and includes body-joint data;
communicating the motion sensor data to a remote server accessible through a cloud platform so that the motion sensor data is stored at a database included by the remote server;
comparing the motion sensor data to benchmark data to detect temporal phases of the motor skill activity, wherein the comparing includes identifying, in the motion sensor data, one or more values of the motion sensor data that correspond to one or more markers of the motor skill activity that are among the benchmark data;
displaying, through a display screen of the mobile computing device, an interactive practice interface including a video preview showing a skeleton of the subject performing the motor skill activity, the video preview being based at least in part upon the RGB video stream and body-joint data, and further including a radar graph illustrating a plurality of subscores associated with the respective temporal phases and based upon at least one comparison of the motion sensor data to the benchmark data; and
determining a score based at least in part upon the plurality of subscores associated with the respective temporal phases, the score representing a proficiency of the subject for performing the motor skill activity.

12. The system according to claim 11, wherein the body-joint data is associated with at least one position or at least one orientation of one or more body parts of the subject.

13. The system according to claim 12, wherein the one or more body parts are selected from the group consisting of: spine, hips, shoulder center, shoulders, neck, elbows, wrists, hands, hand tips, thumbs, knees, ankles, feet, head, and eye sockets.

14. The system according to claim 11, wherein the benchmark data comprise biomechanically advantageous joint orientation values or ranges for one or more body parts for each of the temporal phases.

15. The system according to claim 11, wherein each of the temporal phases comprises a start time and an end time.

16. The system according to claim 15, wherein the interactive practice interface further includes a plurality of frames corresponding respectively to different ones of the temporal phases, and provides an ability to modify the start time or the end time of any temporal phase.

17. The system according to claim 11,
wherein the markers comprise a start time marker and an end time marker for each of the temporal phases of the motor skill activity, and
wherein the comparing of the motion sensor data to the benchmark data to detect the temporal phases involves identifying, in the motion sensor data, the start time marker and the end time marker of each temporal phase of the motor skill activity.

18. The system according to claim 11, wherein the interactive practice interface additionally includes a video preview of an ideal performance of the motor skill activity, and one or more alerts indicating a discrepancy between the motion sensor data and the benchmark data.

19. The system according to claim 11, wherein the motion sensor data and the benchmark data comprise position or orientation data for physical education activities, physical therapy activities, sports activities, or physiological research activities.

20. The system according to claim 11, wherein the comparing of the motion sensor data to the benchmark data involves comparing the motion sensor data to a predetermined model, wherein the predetermined model indicates when each temporal phase begins and ends based on one or more of the markers associated with the performed motor skill activity, wherein the markers are joint orientation markers.

21. A computer program product encoded on one or more non-transitory computer storage media, the computer program product comprising instructions that when executed by at least one computing device cause the at least one computing device to perform operations comprising:
receiving motion sensor data from one or more motion sensors communicatively coupled to a mobile computing device included by the at least one computing device, wherein the motion sensor data at least in part includes a RGB video stream and includes body joint data, and is associated with a subject performing a motor skill activity, and wherein the one or more motion sensors include or includes a camera, an IR emitter, an IR sensor, one or more processor modules, and one or more memory modules;
communicating the motion sensor data to a remote server accessible through a cloud platform so that the motion sensor data is stored at a database included by the remote server;
comparing the motion sensor data to benchmark data to detect temporal phases of the motor skill activity, wherein the comparing includes identifying, in the motion sensor data, one or more values of the motion sensor data that correspond to one or more markers of the motor skill activity that are among the benchmark data;
displaying, through a display screen of the mobile computing device, an interactive practice interface including a video preview concerning the subject performing the motor skill activity, the video preview being based at least in part upon the RGB video stream and body-joint data, and further including a plurality of frames corresponding respectively to different ones of the temporal phases; and
determining, based upon at least one comparison of the motion sensor data associated with the temporal phases to the benchmark data, a score representing a proficiency of the subject for performing the motor skill activity.

22. The computer program product according to claim 21, wherein the body-joint data is associated with at least one position or at least one orientation of one or more body parts of the subject.

23. The computer program product according to claim 22, wherein the one or more body parts are selected from the group consisting of: spine, hips, shoulder center, shoulders, neck, elbows, wrists, hands, hand tips, thumbs, knees, ankles, feet, head, and eye sockets.

24. The computer program product according to claim 21, wherein the benchmark data comprise biomechanically advantageous joint orientation values or ranges for one or more body parts for each of the temporal phases.

25. The computer program product according to claim 21, wherein each of the temporal phases comprises a start time and an end time.

26. The computer program product according to claim 25, wherein the interactive practice interface provides
an ability to modify the start time or the end time of any of the temporal phases, and further includes a radar graph illustrating a plurality of subscores associated with the respective temporal phases, wherein the score is based at least in part upon the plurality of subscores associated with the respective temporal phases and based upon at least one comparison of the motion sensor data to the benchmark data.

27. The computer program product according to claim 21, wherein for each temporal phase of the motor skill activity, the markers comprise a start time marker and an end time marker, and
wherein the comparing of the motion sensor data to the benchmark data to detect the temporal phases involves identifying, in the motion sensor data, the start time marker and the end time marker of each temporal phase of the motor skill activity.

28. The computer program product according to claim 21, wherein either:
the interactive practice interface additionally includes a video preview of an ideal performance of the motor skill activity, and one or more alerts indicating a discrepancy between the motion sensor data and the benchmark data; or
the motion sensor data and the benchmark data comprise position or orientation data for physical education activities, physical therapy activities, sports activities, or physiological research activities.

29. The computer program product according to claim 21, wherein the comparing of the motion sensor data to the benchmark data involves comparing the motion sensor data to a predetermined model, wherein the predetermined model indicates when each temporal phase begins and ends based on one or more of the markers associated with the performed motor skill activity, wherein the markers are joint orientation markers.

30. The computer program product according to claim 21, wherein the video preview includes at least one of an avatar, a skeleton based upon the body joint data, an infrared view, or a depth map.

31. A system, comprising:
at least one computing device having at least one processor and one or more non-transitory computer storage media, wherein the at least one computing device includes a mobile computing device;
one or more motion sensors communicatively coupled to the mobile computing device,
wherein the one or more motion sensors is or are adapted to generate motion sensor data associated with a subject performing a motor skill activity, and wherein the one or more motion sensors include or includes a camera, an IR emitter, an IR sensor, one or more processor modules, and one or more memory modules;
wherein the one or more non-transitory computer storage media store instructions therein that when executed by the at least one processor of the at least one computing device cause the at least one computing device to perform operations comprising:
receiving the motion sensor data from the one or more motion sensors, wherein the motion sensor data at least in part includes a RGB video stream and includes body-joint data;

communicating the motion sensor data to a remote server accessible through a cloud platform so that the motion sensor data is stored at a database included by the remote server;

comparing the motion sensor data to benchmark data to detect temporal phases of the motor skill activity, wherein the comparing includes identifying, in the motion sensor data, one or more values of the motion sensor data that correspond to one or more markers of the motor skill activity that are among the benchmark data;

displaying, through a display screen of the mobile computing device, an interactive practice interface including a video preview concerning the subject performing the motor skill activity, the video preview being based at least in part upon the RGB video stream and body joint data, and further including a radar graph illustrating a plurality of subscores associated with the respective temporal phases and based upon at least one comparison of the motion sensor data to the benchmark data; and determining a score based at least in part upon the plurality of subscores associated with the respective temporal phases, the score representing a proficiency of the subject for performing the motor skill activity.

32. The system according to claim 31, wherein the body-joint data is associated with at least one position or at least one orientation of one or more body parts of the subject.

33. The system according to claim 32, wherein the one or more body parts are selected from the group consisting of: spine, hips, shoulder center, shoulders, neck, elbows, wrists, hands, hand tips, thumbs, knees, ankles, feet, head, and eye sockets.

34. The system according to claim 31, wherein the benchmark data comprise biomechanically advantageous joint orientation values or ranges for one or more body parts for each of the temporal phases.

35. The system according to claim 31, wherein each of the temporal phases comprises a start time and an end time.

36. The system according to claim 35, wherein the interactive practice interface further includes a plurality of frames corresponding respectively to different ones of the temporal phases, and provides an ability to modify the start time or the end time of any temporal phase.

37. The system according to claim 31, wherein the markers comprise a start time marker and an end time marker for each of the temporal phases of the motor skill activity, and wherein the comparing of the motion sensor data to the benchmark data to detect the temporal phases involves identifying, in the motion sensor data, the start time marker and the end time marker of each temporal phase of the motor skill activity.

38. The system according to claim 31, wherein either:

the interactive practice interface additionally includes a video preview of an ideal performance of the motor skill activity, and one or more alerts indicating a discrepancy between the motion sensor data and the benchmark data; or the motion sensor data and the benchmark data comprise position or orientation data for physical education activities, physical therapy activities, sports activities, or physiological research activities.

39. The system according to claim 31, wherein the comparing of the motion sensor data to the benchmark data involves comparing the motion sensor data to a predetermined model, wherein the predetermined model indicates when each temporal phase begins and ends based on one or more of the markers associated with the performed motor skill activity, wherein the markers are joint orientation markers.

40. The computer program product according to claim 31, wherein the video preview includes at least one of an avatar, a skeleton based upon the body joint data, an infrared view, or a depth map.

* * * * *